United States Patent [19]

Okubo et al.

[11] Patent Number: 5,647,010
[45] Date of Patent: Jul. 8, 1997

[54] IMAGE FORMING APPARATUS WITH SECURITY FEATURE WHICH PREVENTS COPYING OF SPECIFIC TYPES OF DOCUMENTS

[75] Inventors: Hiromi Okubo, Yokohama; Mutsuo Shimomae, Yokosuka, both of Japan

[73] Assignee: Ricoh Company, Ltd., Tokyo, Japan

[21] Appl. No.: 305,886

[22] Filed: Sep. 14, 1994

[30] Foreign Application Priority Data

Sep. 14, 1993 [JP] Japan .................................. 5-252407
Mar. 30, 1994 [JP] Japan .................................. 6-085657

[51] Int. Cl.$^6$ ............................................. G06K 9/00
[52] U.S. Cl. .................... 382/100; 283/902; 382/135; 382/137; 399/366; 399/42
[58] Field of Search .................... 355/201; 283/902; 358/462; 382/100, 113, 192, 193, 194, 199, 135, 137, 271, 306; 364/286.6, 949.81; 326/8; 380/4

[56] References Cited

U.S. PATENT DOCUMENTS

| | | | |
|---|---|---|---|
| 4,586,811 | 5/1986 | Kubo et al. | 355/201 |
| 4,739,377 | 4/1988 | Allen | 355/201 |
| 4,791,449 | 12/1988 | Foley et al. | 355/201 |
| 4,882,604 | 11/1989 | Kato et al. | 355/201 |
| 4,953,013 | 8/1990 | Tsuji et al. | 358/462 |
| 4,974,261 | 11/1990 | Nakahara et al. | 382/192 |
| 4,998,122 | 3/1991 | Kanno et al. | 358/462 |
| 5,291,243 | 3/1994 | Heckman et al. | 355/201 |
| 5,321,470 | 6/1994 | Hasuo et al. | 382/135 |
| 5,343,524 | 8/1994 | Mu et al. | 380/4 |
| 5,351,138 | 9/1994 | Sasaki et al. | 358/462 |
| 5,363,202 | 11/1994 | Udagawa et al. | 358/401 |
| 5,408,339 | 4/1995 | Sasaki et al. | 358/462 |
| 5,418,602 | 5/1995 | Nishikawa | 355/201 |
| 5,424,807 | 6/1995 | Ohmura | 355/201 |
| 5,426,710 | 6/1995 | Suzuki et al. | 382/135 |
| 5,481,377 | 1/1996 | Udagawa et al. | 358/401 |

FOREIGN PATENT DOCUMENTS

| | | |
|---|---|---|
| 0459389 | 12/1991 | European Pat. Off. . |
| 0460677 | 12/1991 | European Pat. Off. . |
| 0522769 | 1/1993 | European Pat. Off. . |
| 24 52 949 | 5/1975 | Germany . |
| 283571 | 3/1990 | Japan . |
| 2148382 | 6/1990 | Japan . |
| 446362 | 2/1992 | Japan . |

OTHER PUBLICATIONS

IBM Technical Disclosure Bulletin, vol. 18, No. 1, pp. 59–60, Jun. 1975, G.D. Bruce, "Unauthorized Copy Prevention".

Primary Examiner—Joseph Mancuso
Assistant Examiner—Timothy M. Johnson
Attorney, Agent, or Firm—Oblon, Spivak, McClelland, Maier & Neustadt, P.C.

[57] ABSTRACT

In a digital copier, facsimile machine, scanner, image filing apparatus or similar apparatus, an image processing device is provided with a capability of surely identifying confidential or secrecy documents which should be protected from unauthorized persons. The confidential or inhibited documents are provided with inhibition patterns by printing or copying over the entire surfaces thereof. The device prevents image data representative of this kind of documents from being improperly copied, transferred, stored or input.

3 Claims, 26 Drawing Sheets

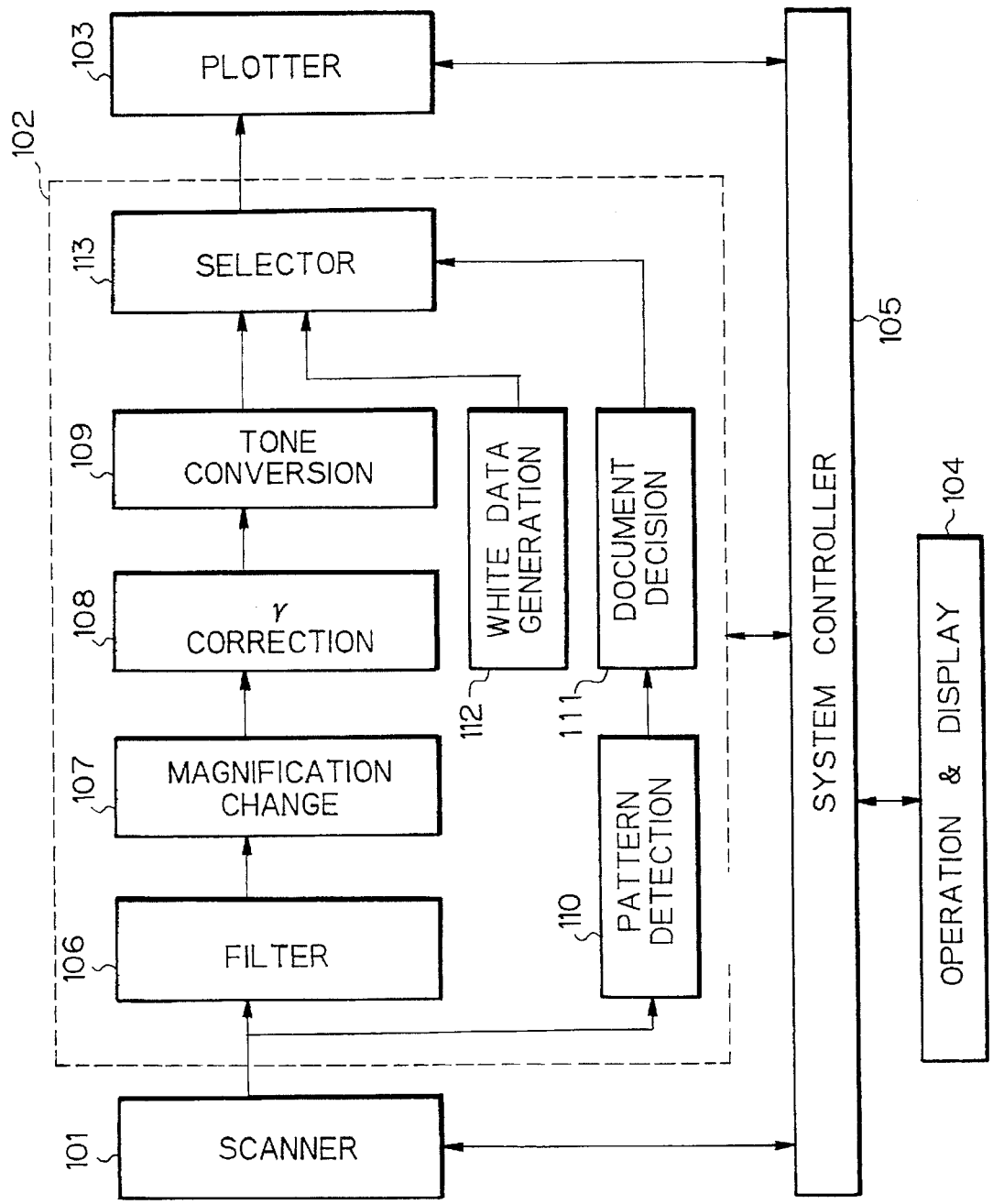

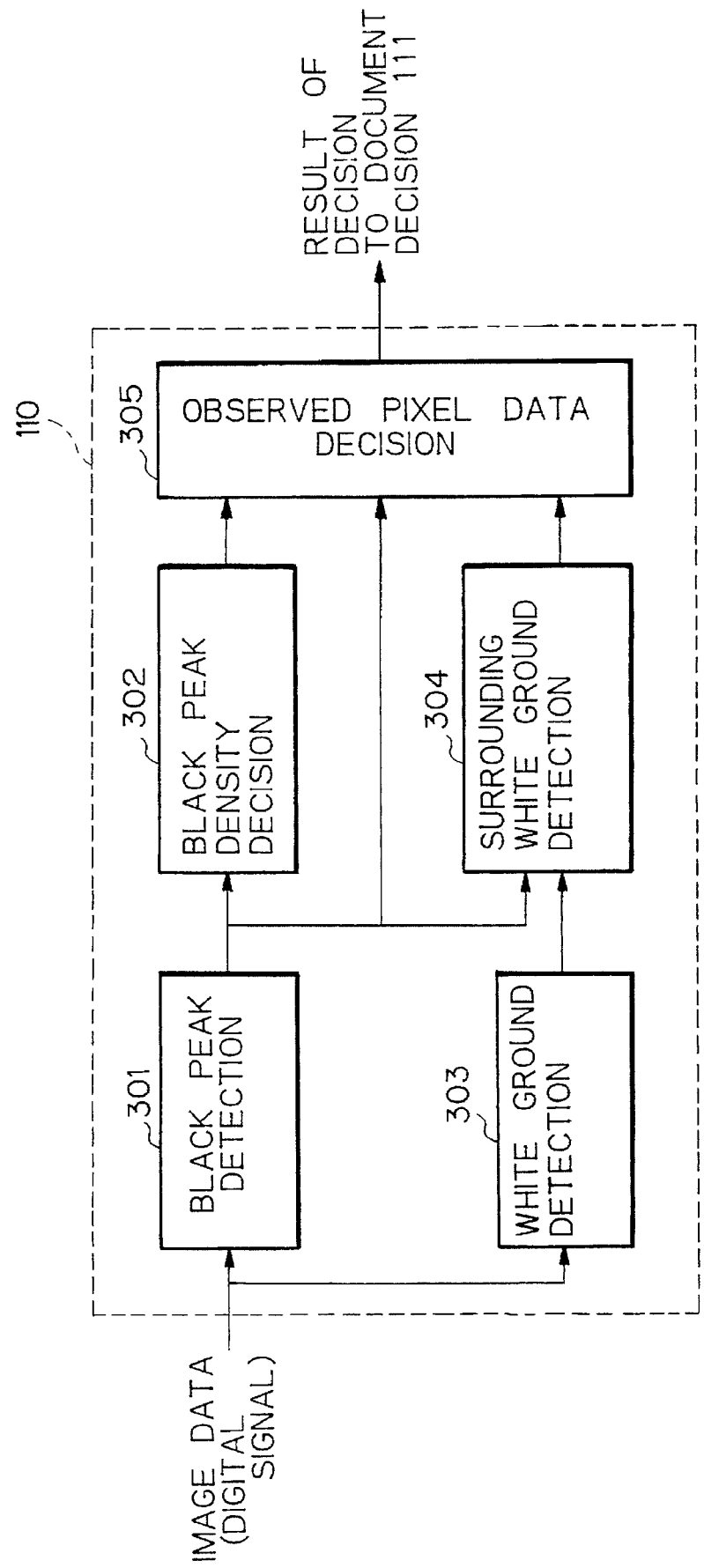

Fig. 4
| A | B | C |
|---|---|---|
| D | E | F |
| G | H | I |
Fig. 5A
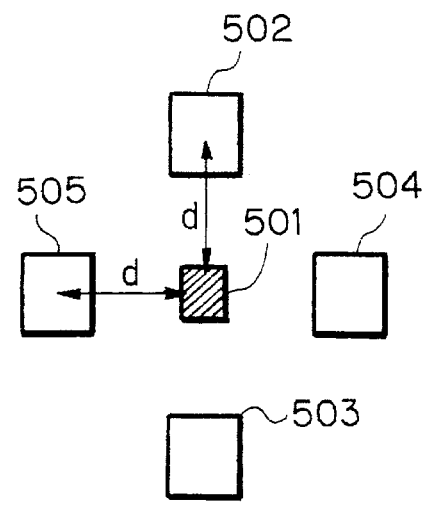
Fig. 5B
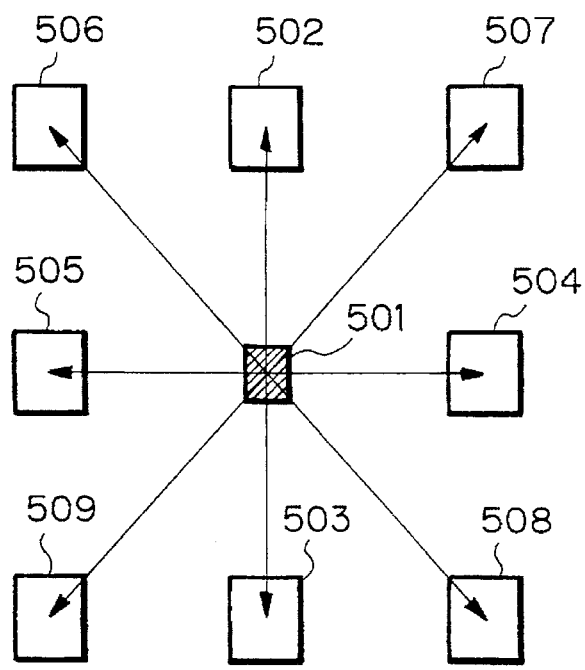

Fig. 24

| A | B | C |
|---|---|---|
|   |   |   |
| D | E | F |
|   |   |   |
| G | H | I |

IMAGE FORMING APPARATUS WITH SECURITY FEATURE WHICH PREVENTS COPYING OF SPECIFIC TYPES OF DOCUMENTS

BACKGROUND OF THE INVENTION

The present invention relates to an image processing device for use in a digital copier, facsimile machine, scanner, image filing apparatus or similar apparatus and, more particularly, to an image processing device capable of preventing unauthorized persons from copying inhibited documents.

Recent progress in image processing and image forming technologies has made it possible to produce even copies of bills as finely as true bills with a digital color copier. Today, a digital color copier capable of identifying special documents prohibited from being reproduced, e.g., bills and securities and preventing them from being copied illegally is available.

To identify special documents of the kind described, image data input to the copier may be compared with a particular registered mark (pattern data) by a pattern matching scheme. If the image data includes the particular mark, the document is determined to be a special document. Alternatively, the identification may rely on the comparison of the configuration of a histogram based on a hue distribution, as taught in Japanese Patent Laid-Open Publication No. 4-54681.

In offices, for example, even ordinary documents other than bills, securities and other special documents are often inhibited from being copied for a secrecy purpose. Let this kind of documents be referred to as inhibited documents for simplicity hereinafter. Usually, inhibited documents dealt with in offices are marked with "TOP SECRET", "NO COPYING" or similar indication and distinguished from other documents which can be copied. However, such a mark is not a substantial implementation for preventing inhibited copies from being copied. Specifically, the precondition for the inhibition is that a person, noticed the mark, sees that the document is an inhibited document and surely observes the inhibition. It is likely that a person copies an inhibited document by a copier, sends it by a facsimile machine, or inputs it in an image filing apparatus.

The conventional method for identifying bills, securities and other special documents may also be used to implement an apparatus for distinguishing inhibited documents from other documents. For example, the apparatus may be constructed to identify the label "TOP SECRET" or "NO COPYING" on a document and inhibit the document from being copied. However, even such an apparatus will fail to identify the inhibited document if a person covers the label with, for example, a paper.

The identification using the configuration of a histogram based on a hue distribution is not applicable to an apparatus handling images in the form of bilevel data, i.e., black and white data. Moreover, the problem with this kind of scheme is that the identification of inhibited documents itself is not satisfactory since numerous kinds of inhibited documents are dealt with in office transactions and since their histograms do not always have a common configuration.

SUMMARY OF THE INVENTION

It is, therefore, an object of the present invention to provide an image processing device capable of surely identifying inhibited documents and preventing them from being copied, transferred, stored or input.

In accordance with the present invention, an image processing device for executing various kinds of image processing, including filtering, magnification change and gamma correction, with input image data comprises a pattern detecting section for determining, pixel data by pixel data, whether or not pixel data constituting the input image data are part of a predetermined inhibition pattern, and a document deciding section for determining, based on the number of pixel data determined to be part of the predetermined inhibition pattern by the pattern detecting section, whether or not the input image data are representative of an inhibited document inhibited from being copied. The inhibited document comprises a sheet on which the inhibition pattern is printed or copied over the entire area thereof.

Also, in accordance with the present invention, an image processing device for executing various kinds of image processing, including filtering, magnification change and gamma correction, with input image data comprises a black peak detecting section for determining, on the basis of individual pixel data constituting the input image data, whether or not pixel data under observation is a black peak by referencing the pixel data and pixel data adjoining it, a black peak density deciding section for determining, based on the output of the black peak detecting section, whether or not a predetermined area centering around the pixel data under observation has a black peak density coincident with the black peak density of a predetermined inhibition pattern, and a document deciding section for determining, based on the number of the pixel data determined to be coincident by the black peak density deciding section, whether or not the input image data are representative of an inhibited document inhibited from being copied. The the inhibited document comprises a sheet on which the inhibition pattern is printed or copied over the entire area thereof.

Also, in accordance with the present invention, an image processing device for executing various kinds of image Processing, including filtering, magnification change and gamma correction, with input image data comprises a black peak detecting section for determining, on the basis of individual pixel data constituting the input image data, whether or not pixel data under observation is a black peak by referencing the pixel data and pixel data adjoining it, a black peak density deciding section for determining, based on the output of the black peak detecting section, whether or not a predetermined area centering around the pixel data under observation has a black peak density coincident with the black peak density of a predetermined inhibition pattern, a white ground detecting section for detecting a white ground out of the input image data, a surrounding white ground deciding section for determining, based on the outputs of the black peak detecting section and white ground detecting section, whether or not a white ground of predetermined size is present around and at a predetermined distance from the pixel data under observation which has been determined to be a black peak, an observed pixel data deciding section for determining, based on the outputs of the black peak density deciding section and surrounding white ground deciding section, whether or not the pixel data under observation is part of the inhibition pattern, and a document deciding section for determining, based on the number of the pixel data determined to be part of the inhibition pattern by the observed pixel data deciding section, whether or not the input image data are representative of an inhibited document inhibited from being copied. The inhibited document comprises a sheet on which the inhibition pattern is printed or copied over the entire area thereof.

Also, in accordance with the present invention, an image processing device for executing various kinds of image processing, including filtering, magnification change and gamma correction, with input image data comprises a pattern detecting section for determining, pixel data by pixel data, whether or not pixel data constituting the input image data are part of a predetermined inhibition pattern, a document deciding section for determining, based on the number of pixel data determined to be part of the predetermined inhibition pattern by the pattern detecting section, whether or not the input image data are representative of an inhibited document inhibited from being copied, and an inhibiting section for inhibiting the input image data from being output when the image data are representative of the inhibited document as determined by the document deciding means. The inhibited document comprises a sheet on which the inhibition pattern is printed or copied over the entire area thereof.

Also, in accordance with the present invention, an image processing device for executing various kinds of image processing, including filtering, magnification change and gamma correction, with input image data has a pattern detecting section for determining, pixel data by pixel data, whether or not pixel data constituting the input image data are part of a predetermined inhibition pattern. The pattern detecting section has variable detection accuracy. A document deciding section determines, based on the number of pixel data determined to be part of the predetermined inhibition pattern by the pattern detecting means, whether or not the input image data are representative of an inhibited document inhibited from being copied. The document deciding section has variable decision accuracy. A changing section changes the detection accuracy of the pattern detecting section and the decision accuracy of the document deciding section. The inhibited document comprises a sheet on which the inhibition pattern is printed or copied over the entire area thereof.

Also, in accordance with the present invention, an image processing device for executing various kinds of image processing, including filtering, magnification change and gamma correction, with input image data comprises a pattern detecting section for determining, pixel data by pixel data, whether or not pixel data constituting the input image data are part of a predetermined inhibition pattern, a document deciding section for determining, based on the number of pixel data determined to be part of the predetermined inhibition pattern by the pattern detecting section, whether or not the input image data are representative of an inhibited document inhibited from being copied, and a warning section for producing a warning when the input image data are representative of the inhibited document as determined by the document deciding section. The inhibited document comprises a sheet on which the inhibition pattern is printed or copied over the entire area thereof.

Further, in accordance with the present invention, an image processing device for executing various kinds of image processing, including filtering, magnification change and gamma correction, with input image data comprises a pattern detecting section for determining, pixel data by pixel data, whether or not pixel data constituting the input image data are part of a predetermined inhibition pattern, a document deciding section for determining, based on the number of pixel data determined to be part of the predetermined inhibition pattern by the pattern detecting section, whether or not the input image data are representative of an inhibited document inhibited from being copied, an inhibiting section for inhibiting the input image data from being output when the input image data are representative of the inhibited document as determined by the document deciding section, and a cancelling section for invalidating the inhibition set by the inhibiting section. The inhibited document comprises a sheet on which the inhibition pattern is printed or copied over the entire area thereof.

Further, in accordance with the present invention, an image processing device for executing various kinds of image processing, including shading correction, filtering, magnification change, gamma correction and tone conversion comprises a pattern detecting section for determining, pixel data by pixel data, whether or not pixel data constituting the input image data, subjected to the shading correction but not to the other processing, are part of a predetermined inhibition pattern, and a document deciding section for determining, based on the number of pixel data determined to be part of the predetermined inhibition pattern by the pattern detecting section, whether or not the input image data are representative of an inhibited document inhibited from being copied. The inhibited document comprises a sheet on which the inhibition pattern is printed or copied over the entire area thereof.

Furthermore, in accordance with the present invention, an image processing device for executing various kinds of image processing, including shading correction, filtering, magnification change and gamma correction and tone conversion, with input image data comprises a black peak detecting section for determining, on the basis of individual pixel data constituting the input image data, whether or not pixel data under observation is a black peak by referencing the pixel data and pixel data adjoining it, a black peak density deciding section for determining, based on the output of the black peak detecting section, whether or not a predetermined area centering around the pixel data under observation has a black peak density coincident with the black peak density of a predetermined inhibition pattern, a white ground detecting section for detecting a white ground out of the input image data, an edge detecting section for detecting an edge region in response to the input image data, a surrounding white ground deciding section for determining, based on the outputs of the black peak detecting section and white ground detecting section, whether or not a white ground of predetermined size is present around and at a predetermined distance from the pixel data under observation which has been determined to be coincident with the black peak density of the inhibition pattern, a mesh graph/mesh character deciding section for determining, based on the outputs of the black peak density deciding section and edge detecting section, whether or not the pixel data under observation which has been determined to be coincident with the black peak density of the inhibition pattern lies in either a mesh graph or a mesh character, an observed pixel data deciding section for determining, based on the outputs of the black peak density deciding section, surrounding white ground deciding section and mesh graph/mesh character deciding section, whether or not the pixel data under observation is part of the inhibition pattern, and a document deciding section for determining, based on the number of the pixel data determined to be part of the inhibition pattern by the observed pixel data deciding section, whether or not the input image data are representative of an inhibited document inhibited from being copied. The inhibited document comprises a sheet on which the inhibition pattern is printed or copied over the entire area thereof.

Moreover, in accordance with the present invention, an image processing device for executing various kinds of image processing, including shading correction, filtering, magnification change and gamma correction and tone conversion, with input image data comprises a black peak detecting section for determining, on the basis of individual pixel data constituting the input on the basis of individual pixel data under observation is a black peak by referencing the pixel data and pixel data adjoining it, a black peak density deciding section for determining, based on the output of the black peak detecting section, whether or not a predeterminedarea centering around the pixel data under observation has a black peak density coincident with a black peak density of a predetermined inhibition pattern, a white ground detecting section for detecting a white ground out of the input image data, an edge detecting section for detecting an edge region in response to the input image data, a surrounding white ground deciding section for determining, based on the outputs of the black peak detecting section and white ground detecting section, whether or not a white ground of predetermined size is present around and at a predetermined distance from the pixel data under observation which has been determined to be coincident with the black peak density of the inhibition pattern, a mesh graph/mesh character deciding section for determining, based on the outputs of the black peak density deciding means and edge detecting section, whether or not the pixel data under observation which has been determined to be coincident with the black peak density of the inhibition pattern lies in either a mesh graph or a mesh character, an observed pixel data deciding section for determining, based on the outputs of the black peak density deciding section, surrounding white ground deciding section and mesh graph/mesh character deciding section, whether or not the pixel data under observation is part of the inhibition pattern, a document deciding section for determining, based on the number of the pixel data determined to be part of the inhibition pattern by the observed pixel data deciding section, whether or not the input image data are representative of an inhibited document inhibited from being copied, and an inhibiting section for inhibiting the input image data from being output when the input image data are representative of the inhibited document as determined by the document deciding section. The inhibited document comprises a sheet on which the inhibition pattern is printed or copied over the entire area thereof.

In addition, in accordance with the present invention, an image processing device for executing various kinds of image processing, including shading correction, filtering, magnification change, gamma correction and tone conversion, with input image data of the present invention comprises a pattern detecting section for determining, pixel data by pixel data, whether or not pixel data constituting the input image data, subjected to the shading correction but not to the other processing, are part of a predetermined inhibition pattern, a document deciding section for determining, based on the number of pixel data determined to be part of the predetermined inhibition pattern by the pattern detecting section, whether or not the input image data are representative of an inhibited document inhibited from being copied, and a pattern printing section for printing the inhibited pattern indicative of an inhibited document inhibited from being copied. The inhibited document comprises a sheet on which the inhibition pattern is printed or copied over the entire area thereof.

BRIEF DESCRIPTION OF THE DRAWINGS

The above and other objects, features and advantages of the present invention will become more apparent from the following detailed description taken with the accompanying drawings in which:

FIG. 1 is a block diagram schematically showing a first embodiment of the digital copier in accordance with the present invention;

FIG. 3 is a block diagram schematically showing a pattern detecting section included in the embodiment;

FIG. 4 shows a specific matrix with which a black peak detecting section, also included in the embodiment, detects a black peak;

FIGS. 5A and 5B each shows a specific method of detecting a surrounding white ground;

FIG. 24 shows a 3 by 5 matrix applicable to a black peak detecting section included in the eighth embodiment.

DESCRIPTION OF THE PREFERRED EMBODIMENTS

Figure 2A:
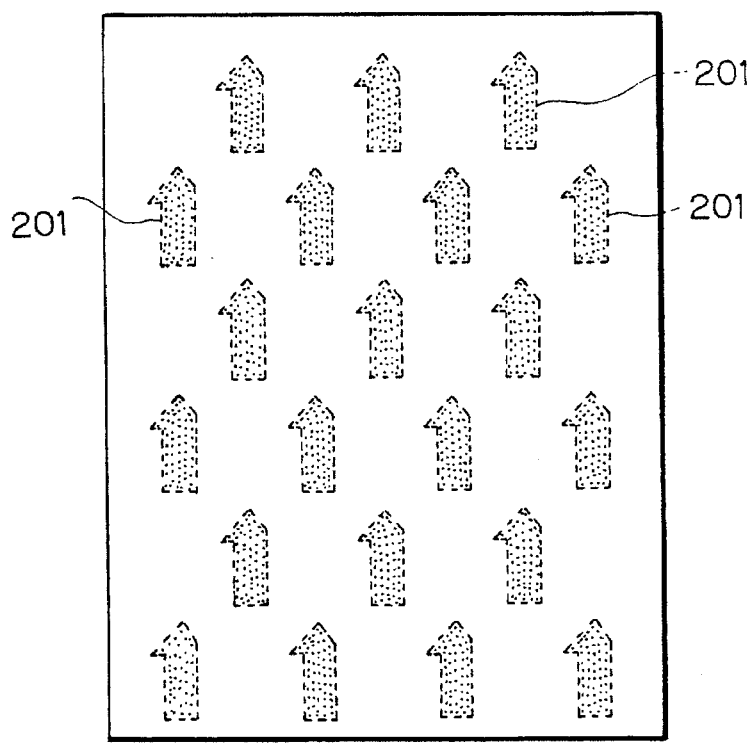
FIGS. 2A and 2B show specific inhibition patterns applicable to the embodiment.

Preferred embodiments of the image processing device in accordance with the present invention will be described with reference to the accompanying drawings and in relation to a digital copier by way of example.

1st Embodiment

Briefly, this embodiment determines, pixel by pixel, whether pixel data representative of an image form part of a predetermined inhibition pattern and then determines, based on the number of pixel data found to form of the inhibition pattern, whether or not the image data represent an inhibited document. As a result, inhibited documents are surely distinguished from ordinary documents which are allowed to be copied. This can be done if the inhibited documents are implemented as sheets on which an inhibition pattern or patterns are printed or copied beforehand.

The embodiment will be described under the following items: (I) General Construction of Digital Copier, (II) Inhibition Pattern, (III) Detecting Section, (IV) Decision Section, and (V) Decision Routine.

(I) General Construction of Digital Copier

Referring to FIG. 1, the general construction of a digital copier implemented with the illustrative embodiment is schematically shown. As shown, the copier has a scanner 101 for reading a document and converting the resulting analog image data to digital image data or signal. An image processing section, generally 102, receives the digital image data from the scanner 101 and executes therewith various kinds of image processing and a decision routine of the present invention, which will be described. A plotter 103 prints out the processed image data on a sheet. An operation and display panel 104 allows various kinds of modes to be input thereon and displays necessary messages. A system controller 105 controls the sections 101–104.

In the image processing section 102, a filter 106 has a shading correction filter, smoothing filter, edge enhancing filter and other conventional filters for filtering the input image data in various ways. A magnification change 107 changes the magnification of the image data. A gamma ($\gamma$) correction 108 executes gamma correction with the image data. A tone conversion 109 converts the image data to predetermined multilevel data. A pattern detection 110 determines, on a pixel basis, whether the image data form part of a preselected inhibition pattern, pixel by pixel. A document decision 111 determines, based on the number of pixel data determined to form part of the inhibition pattern, whether or not the image data represents a an inhibited document. A white data generation 112 generates image data in the form of white data. A selector 113 selects, according to the output of the document decision 111, either the image data from the tone conversion 109 or the image data, or white data, from the white data generation 112. The image data from the selector 113 is applied to the plotter 103.

(II) Inhibition Pattern

Figure 2B:
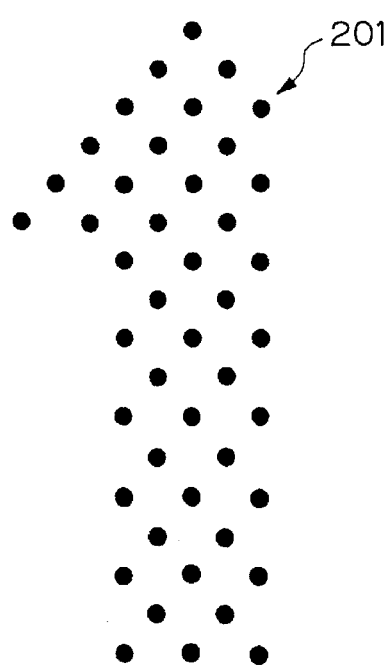

A reference will be made to FIGS. 2A and 2B for describing the inhibition pattern indicating whether or not the document represented by the image data is an inhibited document. In the illustrative embodiment, a document with the inhibition pattern is determined to be an inhibited document. It is, therefore, assumed that the inhibition pattern or patterns are printed or copied on the entire surface of an inhibited document beforehand. For example, as shown in FIG. 2A, inhibition patterns 201 may be printed or copied on the entire surface of a fresh sheet. Such a sheet will turn out a secrecy or inhibited document when information is recorded therein. In this embodiment, the inhibition patterns 201 are implemented by a conventional secrecy numbering function available with a digital copier, although such an implementation is only illustrative. As shown in FIG. 2B in an enlarged scale, the inhibition patterns 201 are each configured by a mesh of about 65 lines (numeral "1" in the figure). When the patterns 201 are distributed over the entire surface of a document, as shown in FIG. 2A, the embodiment determines it to be an inhibited document and prevents it from being copied, as will be described in detail later. For the other documents, the embodiment performs an ordinary copying operation.

(III) Detecting Section

FIG. 3 shows the pattern detection 110 specifically. As shown, the pattern detection 110 includes a black peak detection 301 which determines, pixel by pixel, whether or not pixel data being observed is a black peak on the basis of a relation between it and surrounding pixel data. A black peak density decision 302 determines, in response to the outputs of the black peak detection 301, whether or not the black peak density of a predetermined area having the pixel data under observation at the center is coincident with that of the predetermined inhibition pattern. A white ground detection 303 receives the image data so as to detect a white ground. A surrounding white ground decision 304 determines, in response to the outputs of the black peak detection 301 and white ground detection 303, whether or not a white area of predetermined size exists around and at a predetermined distance from the pixel data determined to be a black peak. An observed pixel data decision 305 determines whether or not the pixel data under observation is part of the inhibition pattern in response to the outputs of the black peak density decision 303 and surrounding white ground decision.

FIG. 4 shows a specific 3 by 3 pixel matrix applicable to the black peak detection 301. In the pixel matrix, a pixel E is assumed to be the center pixel being observed. If the center pixel E is higher in density than the other pixels of the matrix and has a density higher than a predetermined threshold (referred to as a black peak threshold hereinafter), the detection 301 determines that the pixel data under observation is a black peak pixel.

The black peak density decision 302 determines a black peak density in a predetermined area centering around the pixel data under observation (e.g., 11 by 11 matrix), and then whether or not the density is equal to the peak density of the mesh of about 65 lines particular to the inhibition pattern 201, FIGS. 2A and 2B.

Likewise, the white ground detection 303 determines whether or not a white ground exists in a predetermined area. Specifically, the detection 303 binarizes pixels constituting an M by M matrix (e.g., 11×11 matrix) by use of a preselected threshold (referred to as a white ground threshold hereinafter) and determines, if all the pixels in the matrix are white, the matrix to be a white ground.

The surrounding white ground decision 304 is responsive to the outputs of the white ground detection 303 and black peak detection 301 for determining whether or not a white ground exists at positions a predetermined distance apart from the pixel determined to be a black pixel. For example, as shown in FIG. 5A, assume that a white ground exists at each of positions 502, 503, 504 and 505 which are a predetermined distance d apart from the pixel 501 under observation. Then, the decision 304 determines that the pixel 501 is surrounded by a white ground. If desired, the four positions, i.e., upper, lower, left and right positions 502–505 may be replaced with eight positions 502–509 shown in FIG. 5B in order to enhance accuracy. The eight positions 502–509 are an upper, lower, left, right, upper left, upper right, lower right and lower left positions. Furthermore, only the two positions 502 and 503 of FIG. 5A may be used for the purpose of simplifying the hardware architecture.

The observed pixel data decision 305 receives the outputs of the black peak density decision 302 and surrounding white ground decision 304. Only if the black peak pixel, or pixel under observation, has a black peak density particular to the inhibition pattern and is surrounded by a white ground at a predetermined distance, the decision 305 determines that the pixel data under observation forms part of the inhibition pattern. Then, the decision 305 outputs the result of decision.

(IV) Decision Section

Figure 6:
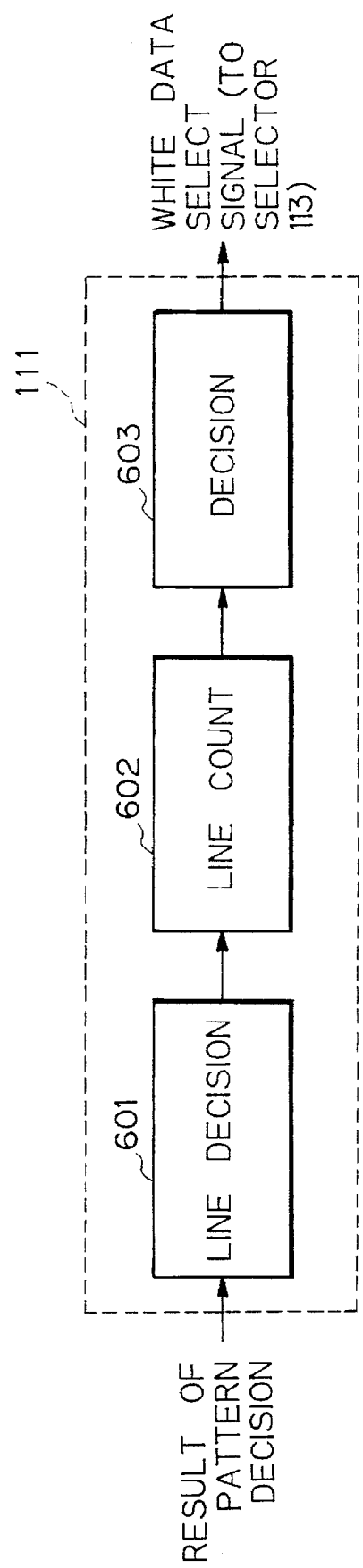
FIG. 6 is a schematic block diagram of a decision section also included in the embodiment.

Referring to FIG. 6, the document decision 111 includes a line decision 601 which receives the results of pixel-by-pixel decision from the observed pixel data decision 305 of the pattern detection 110. The line decision 601 counts the pixel data on one line in the main scanning direction which have been determined to be part of the inhibition pattern. If the number of such pixels is greater than a predetermined first threshold TH1, the line decision 601 determines that the line is an inhibition pattern line. A line count 602 holds the results of decision of the line decision 601 over N lines and counts inhibition pattern lines on the N lines (count M). A decision 603 determines, if the count M of the line count 602 (M ≦N) is greater than a predetermined second threshold TH2, that the image data represent an inhibited document and causes a white data select signal to go high.

(V) Decision Routine

A reference will be made to FIGS. 7A, 7B and 8 for describing the decision procedure for identifying an inhibited document more specifically. Assume that a person sets a desired document at a predetermined position of the scanner 101 and then presses a copy start key, not shown, provided on the operation and display panel 104. Then, the scanner 101 reads the document and sends the resulting digital image signal, or image data, to the image processing section 102. This section 102 delivers the input image data to both the filter 106 and the pattern detection 110. The image data applied to the filter 106 are sequentially processed by the filter 106, magnification change 107, gamma correction 108 and tone conversion 109, as stated earlier, and then transferred to the selector 113. On the other hand, the pattern detection 110 determines, pixel by pixel, whether or not the input pixel data representing the document image are part of the predetermined inhibition pattern.

Figure 7A:
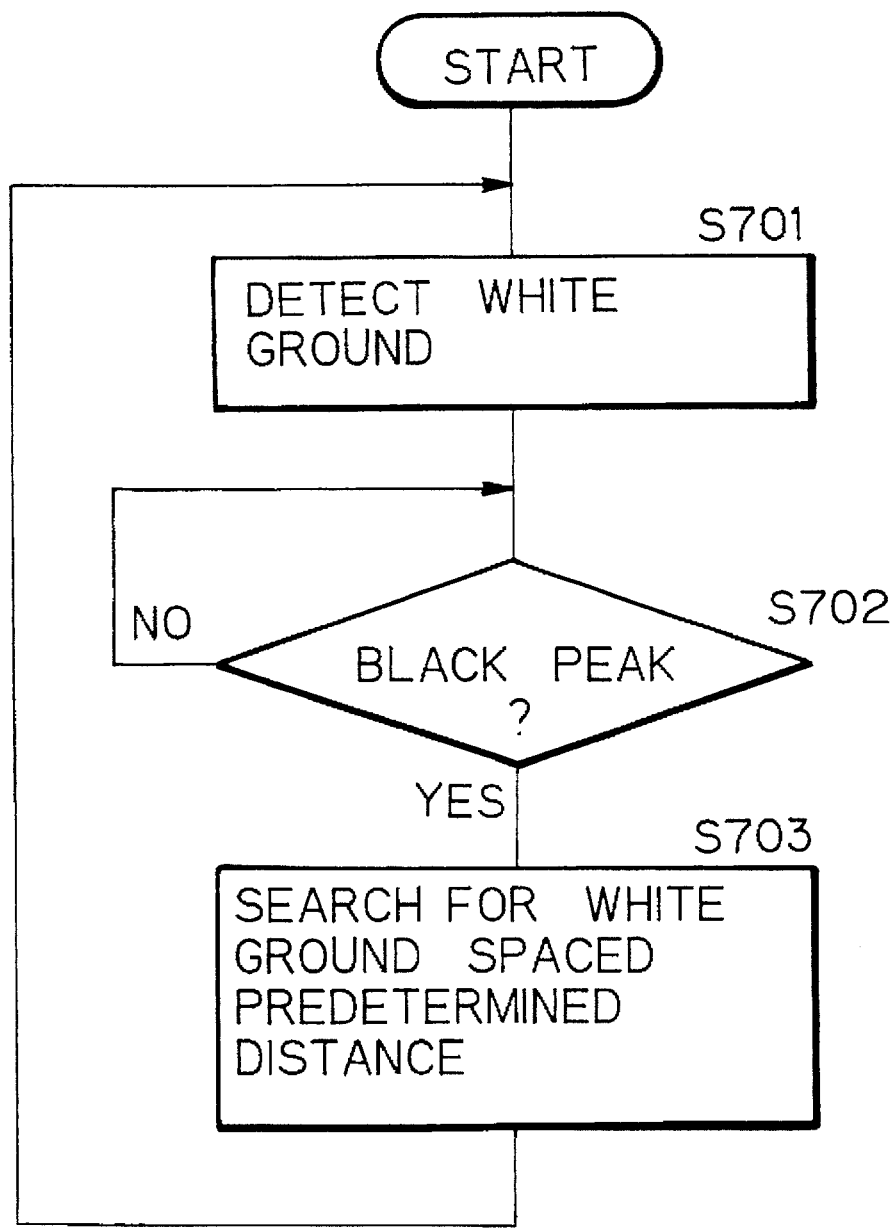
FIGS. 7A and 7B are flowcharts demonstrating a specific operation of the pattern detecting section.

FIG. 7A demonstrates the operations of the white ground detection 303 and surrounding white ground decision 304 included in the pattern detection 110. FIG. 7B shows the operations of the black peak detection 301, black peak density decision 302 and observed pixel data decision 305. The procedures shown in these figurers are executed in parallel at the same time.

As shown in FIG. 7A, the white ground detection 303 determines whether or not a white ground exists in a predetermined area (step S701). Subsequently, the surrounding white ground decision 304 determines, based on the output of the black peak detection 301, whether or not the pixel data under observation is a black peak (step S702). If the pixel data under observation is a black peak (Yes, step S702), the surrounding white ground decision 304 determines whether or not a white ground is present in a zone which is a predetermined distance apart from the pixel determined to be a black peak pixel (step S703). The result of decision in the step S703 is fed to the observed pixel data decision 305. On the other hand, if the pixel data under observation is not a black peak (No, step S702), the program returns to the step S701, ending the processing on the observed pixel data.

Figure 7B:
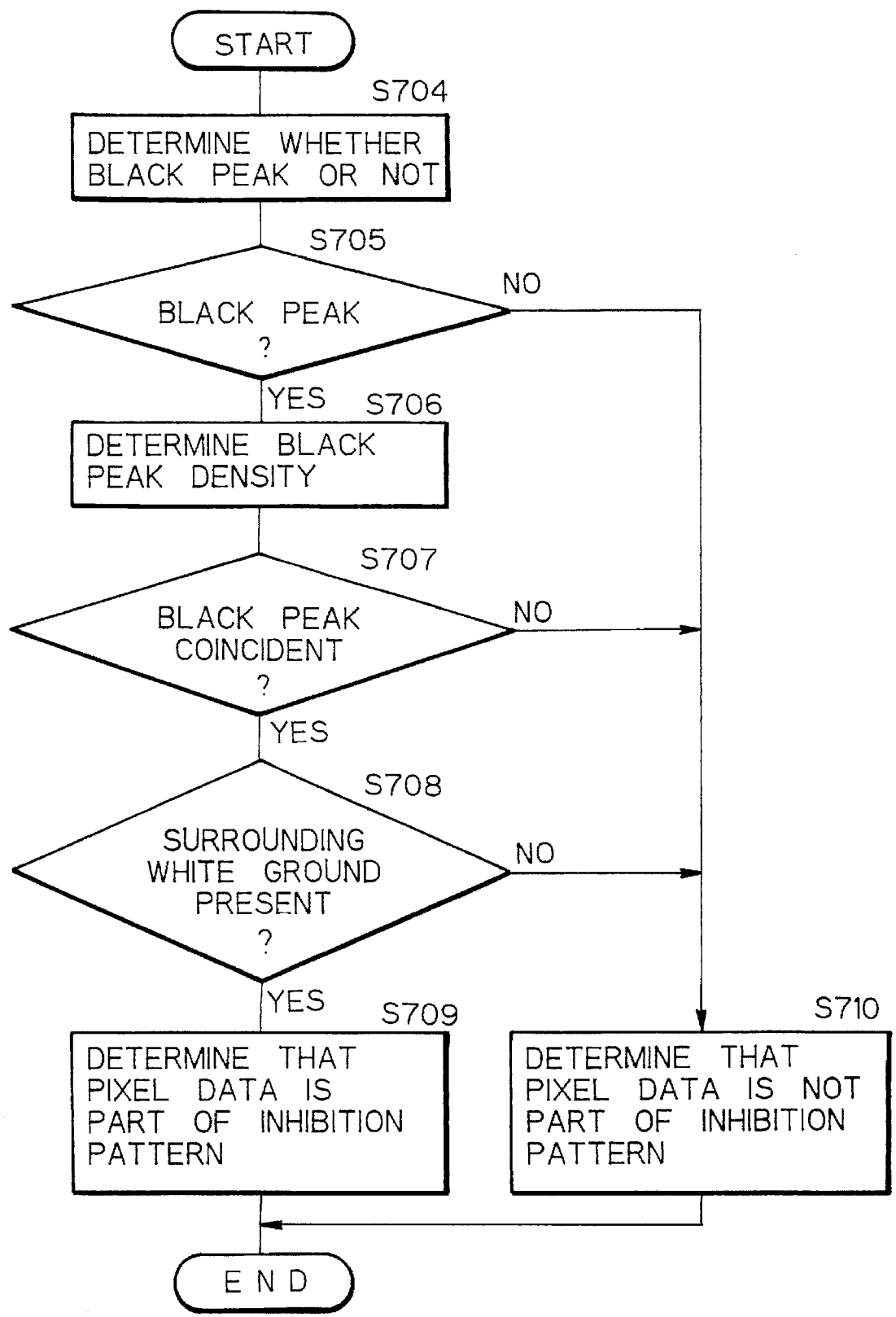

As shown in FIG. 7B, the black peak detection 301 determined whether or not the pixel data under observation is a black peak (steps S704 and S705). If it is not a black peak (No, step S705), the observed pixel data decision 305 determines that the pixel data under observation is not part of the inhibition pattern (step S710). If the pixel data is a black pixel (Yes, step S705), the black peak density decision 302 calculates a density of black peaks (step S706) and determines whether or not the density is coincident with the black peak density of the inhibition pattern (step S707). If the determined black peak density is not coincident with the black peak density of the inhibition pattern (No, step S707), the observed pixel data decision 305 determines that the pixel data under observation is not part of the inhibition pattern (step S710). If the answer of the step S707 is positive, Yes, the decision 305 determines whether or not a surrounding white ground exists on the basis of the output of the surrounding white ground decision 304 (step S708). If a surrounding white ground exists (Yes, step S708), the decision 305 determines that the pixel data under observation is part of the inhibition pattern (step S709). If the answer of the step S708 is negative, No, the decision 305 determines that the pixel data is not part of the inhibition pattern (step S710).

It is to be noted that the steps S701–S710 described above are executed with each of the pixel data representative of the document image and then with the entire document image.

Figure 8:
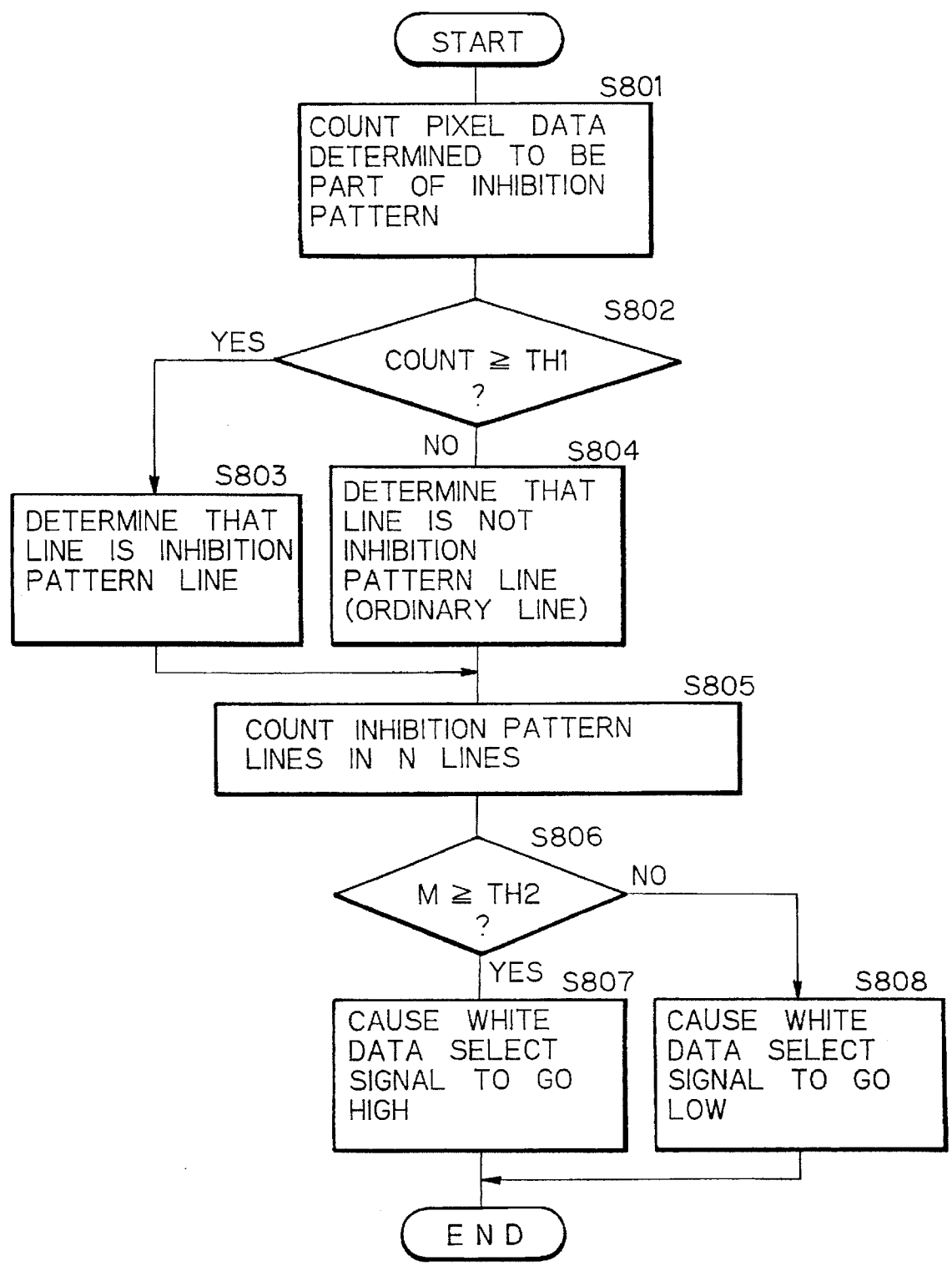
FIG. 8 is a flowchart representative of a specific operation of the decision section.

FIG. 8 shows the operation of the document decision 111. To begin with, the results of pixel-by-pixel decision relating to the inhibition pattern are applied to the line decision 601. The line decision 601 counts the pixel data on one line in the main scanning direction which have been determined to be part of the inhibition pattern (step S801). Then, the decision 601 compares the resulting count with the first threshold TH1 to see if the former is greater than or equal to the latter (step S802). If the answer of the step S802 is positive, Yes, the decision 601 determines that the line is an inhibition pattern line (step S803); if otherwise, it determines that the line is an ordinary line as distinguished from an inhibition pattern line (S804). Subsequently, the line count 602 holds the results of decision of the decision 601 over N consecutive lines and counts the inhibition pattern lines included in the N lines. (count M) (step S805). Thereafter, the decision 603 compares the count M with the second threshold TH2 (S806) and, if the former is greater than or equal to the latter (Yes, step S806), causes the previously mentioned white data select signal to go high (step S807). If the answer of the step S806 is negative, No, the decision 603 causes the white data select signal to go low (S808). The selector 113 receives image data from both the tone conversion 109 and the white data generation 112, as stated previously. If the white data select signal from the decision 111 is in a high level, the selector 113 selectively applies the white data from the white data generation 112 to the plotter 103. If the signal is in a low level, the selector 113 selectively delivers the image data from the tone conversion 109 to the plotter 103.

By the above procedure, when the desired document is determined to be an inhibited document on the basis of the inhibition patterns, the image data are replaced with white data and, therefore, not output to the plotter 103. Stated another way, the selector 113 inhibits the image data representative of the inhibited document from being copied.

As stated above, the embodiment determines that the pixel data under observation is part of the inhibition pattern when the black peak pixels (observed pixels) have a density particular to the inhibition pattern and a white ground exists at a predetermined distance. Hence, the embodiment can detect the inhibition pattern surely and easily.

Further, the embodiment examines each line to see if it is an inhibition pattern line and determines, when the number M of such inhibition pattern lines exceeds a predetermined value in N lines, that the document is an inhibited document. This successfully identifies an inhibited document without errors. In addition, the white data generation 112 and selector 113 allow a portion of a document, which is determined to be an inhibited document, to be surely erased even from the middle.

While the embodiment has been shown and described in relation to a digital copier, it is similarly applicable to a facsimile machine for the purpose of preventing data representing an inhibited document from being sent. When the embodiment is applied to an image filing apparatus, it will prevent inhibited documents from being filed. Further, when the embodiment is applied to a scanner, it will prevent inhibited documents from being read.

The white data, selectively replacing the image data in the embodiment, may be replaced with black data or even with data representative of a predetermined pattern.

2nd Embodiment

This embodiment allows the detection accuracy of the pattern detection 110 and the decision accuracy of the document decision 111 to be changed on the operation and display panel 104 so as to implement more strict decision. This scheme is desirable when the probability that image data representative of inhibited documents are input on the copier is high. The following description will concentrate on the differences of the second embodiment from the first embodiment.

Figure 9:
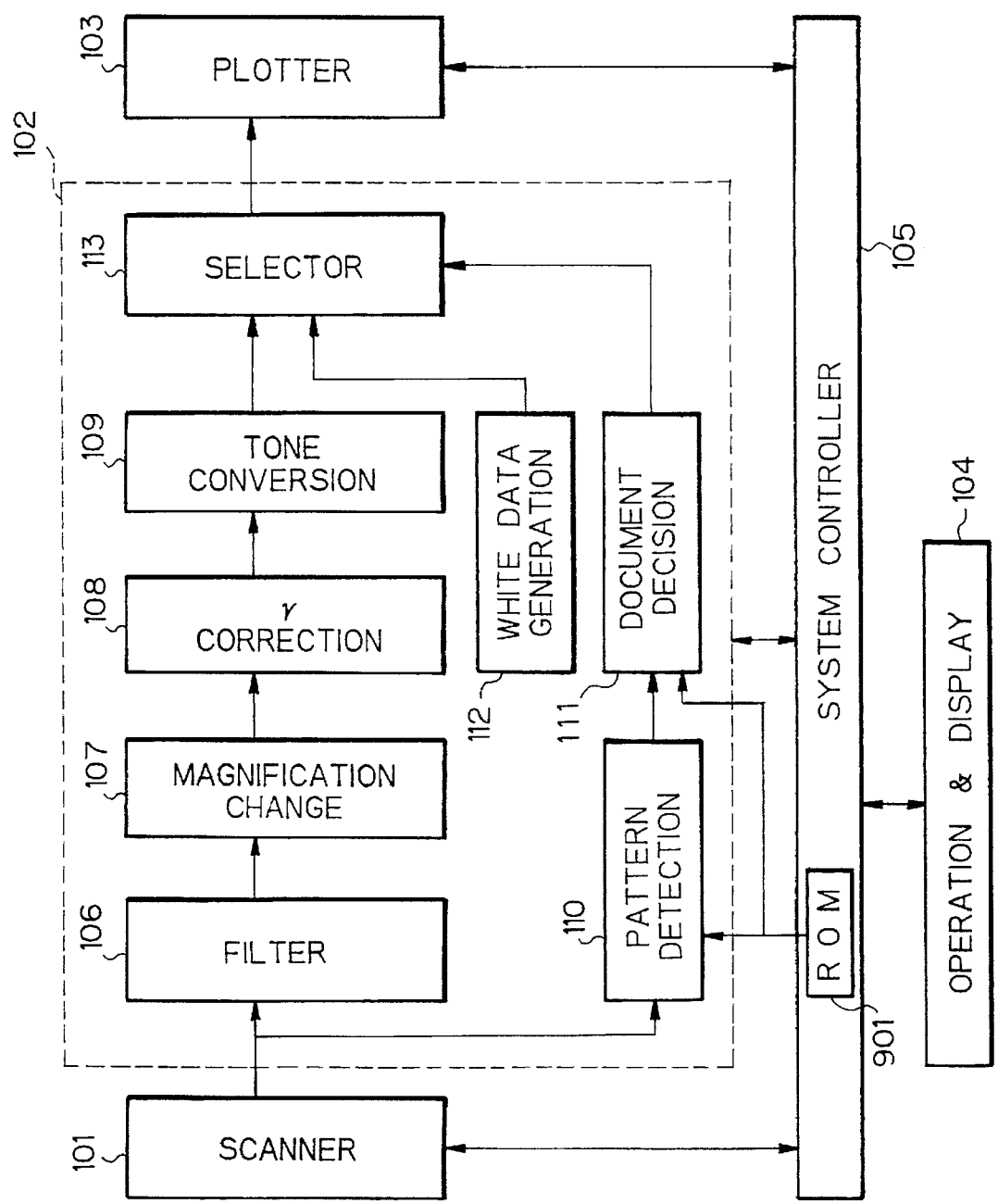
FIGS. 9–13 are schematic block diagrams respectively showing a second to a sixth embodiment of the present invention.

As shown in FIG. 9, the system controller 105 includes a ROM(Read Only Memory) 901 storing parameters for changing the detection accuracy of the pattern detection 110 and parameters for changing the decision accuracy of the document decision 111. The parameters relating to the pattern detection 110 may include the black peak threshold of the black peak detection 301, the white peak threshold of the white ground detection 303, and the number of directions to be observed, FIGS. 5A and 5B. The parameters associated with the document decision 111 may include the first threshold TH1 of the line decision 601 and the second threshold TH2 of the decision 603.

In operation, when a particular identification (ID) number is entered on the operation and display panel 104, particular parameters matching the ID number are transferred from the ROM 901 to the pattern detection 110 and decision 111. When the parameters are of the kind enhancing strict decision, an inhibited document will be identified with higher accuracy.

With the embodiment allowing the decision accuracy to be changed, the user can strictly prevent inhibited documents from being copied, depending on the conditions and environment of use and so forth. When the chance that inhibited documents is copied is little, the decision accuracy may be reduced to minimize an occurrence that an ordinary document is mistaken for an inhibited document.

3rd Embodiment

This embodiment allows the pattern on accuracy of the pattern detector 110 and the decision accuracy of the decision 111 to be automatically changed via a timer. With this embodiment, it is possible to effect more strict decision in a time zone in which the entry of image data representing inhibited documents is quite probable. This embodiment is essentially similar to the second embodiment except for the following.

Figure 10:
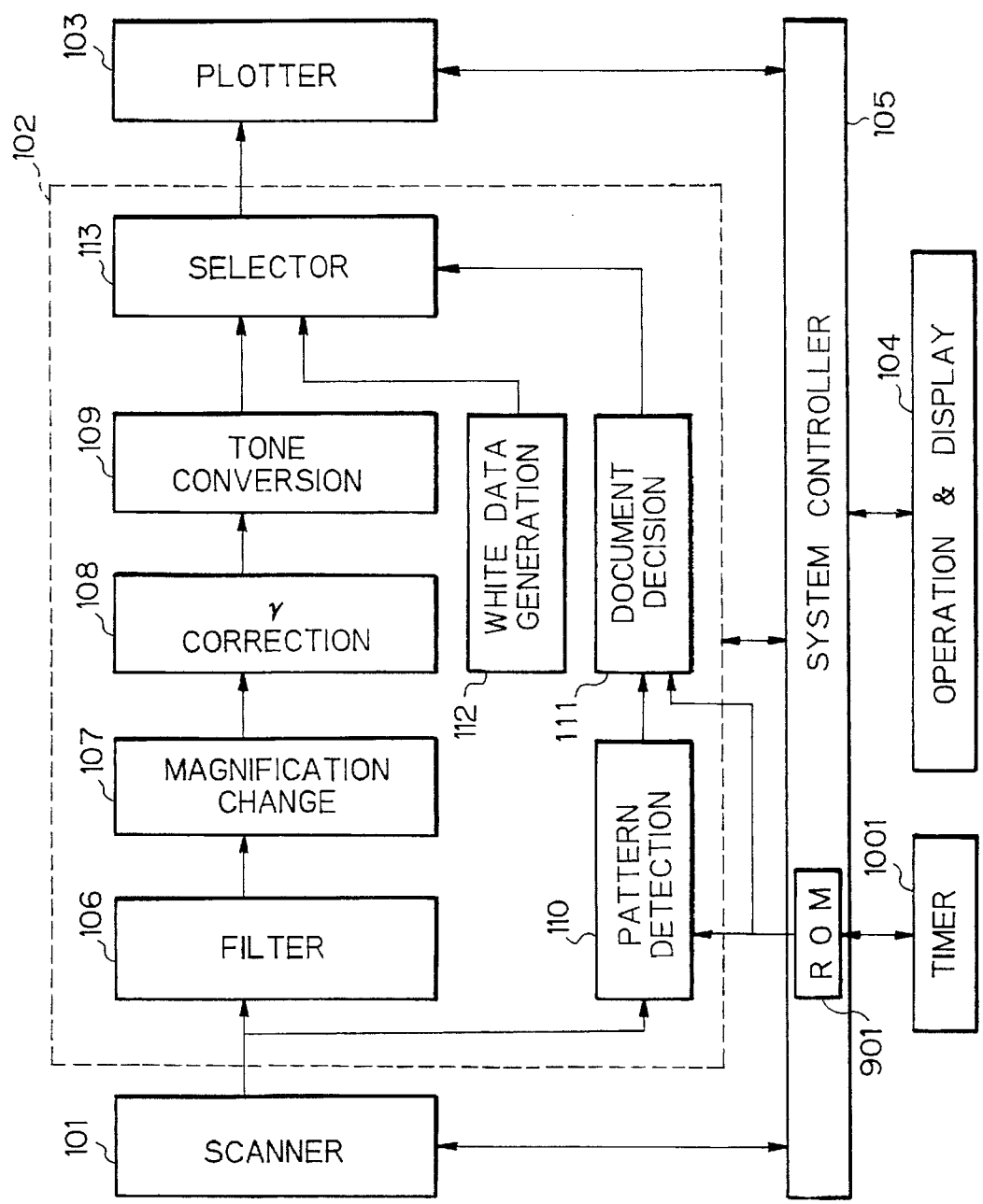

As shown in FIG. 10, the system controller 105 includes the ROM 901 storing parameters for changing the detection accuracy of the pattern detection 110 and parameters for changing the decision accuracy of the document decision 111. A timer 1001 is connected to the system controller 105. Assume that a desired period of time is set on the operation and display panel 104. Then, when a preset time is reached, the system controller 105 controls the ROM 901 t o automatically set particular parameters in the pattern detection 110 and document decision 111. With the timer 1001, it is possible to set parameters for more strict decision during nighttime or on holidays when the improper copying of confidential papers is apt to occur and to loosen them during daytime of weekdays in order to reduce erroneous decision.

The embodiment allows the user to set desired parameters in the pattern detection 110 and document decision 111 on the basis of time and, therefore, to change the strictness of decision during desired hours.

4th Embodiment

When the document to be copied is an inhibited document, this embodiment produces a warning via the operation and display panel 104. This embodiment essentially similar to the first embodiment except for the following.

Figure 11:
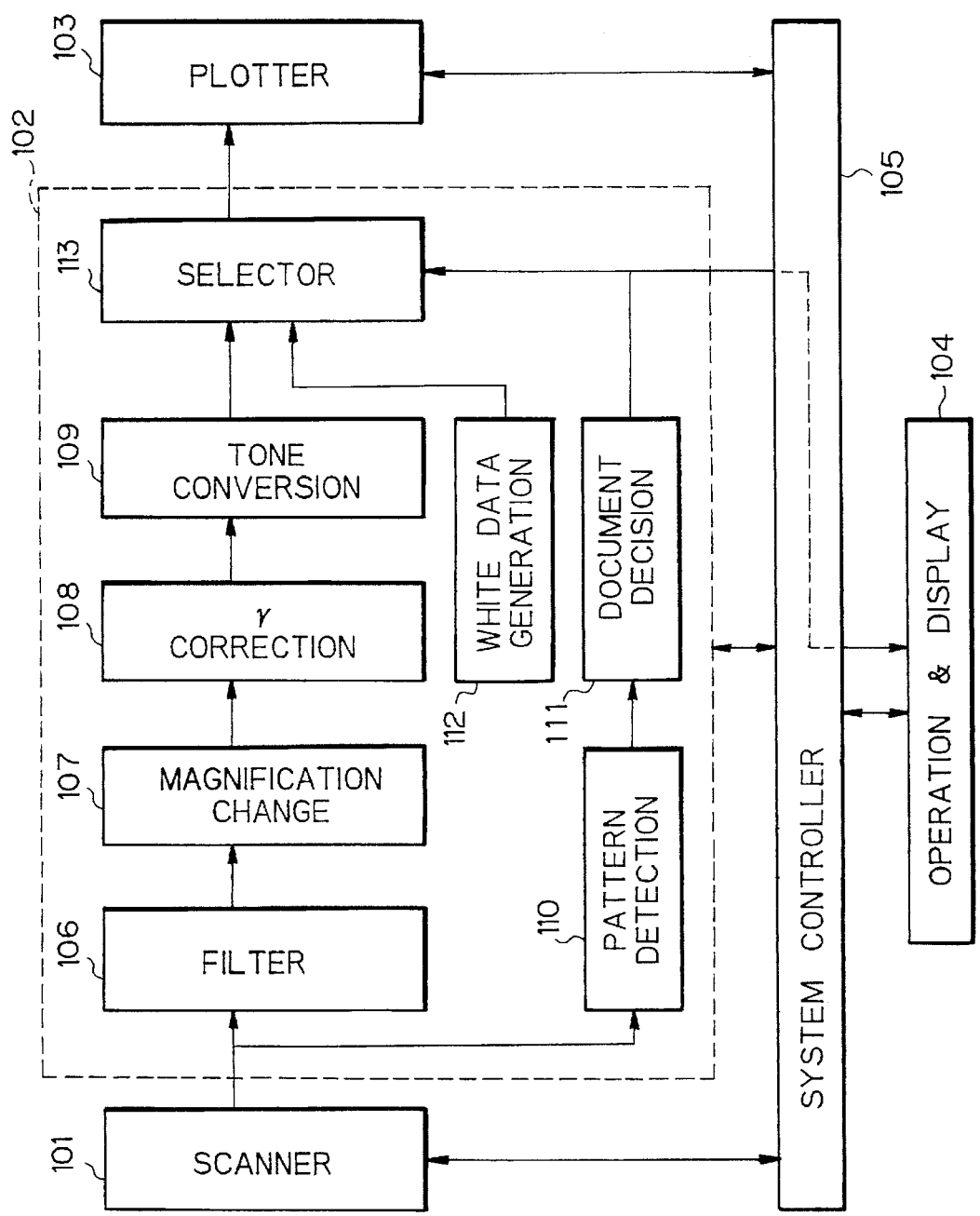

FIG. 11 is a block diagram schematically showing the fourth embodiment. Assume that the document decision 111 causes the white data decision signal coupled to the system controller 105 to go high. Then, the system controller 105 determines that an inhibited document has been copied and shows on the display (e.g., liquid crystal display) of the display and operation panel 104 a message, e.g., "Inhibited document was copied" or "This document is inhibited" for warning the operator.

By displaying the warning message on the operation and display panel 104, this embodiment checks persons tending to copy confidential documents improperly, while achieving the advantages of the first embodiment at the same time.

5th Embodiment

When the document to be copied is an inhibited document, this embodiment produces a warning via a buzzer, loudspeaker or similar audible output means. This embodiment is also essentially similar to the first embodiment except for the following.

Figure 12:
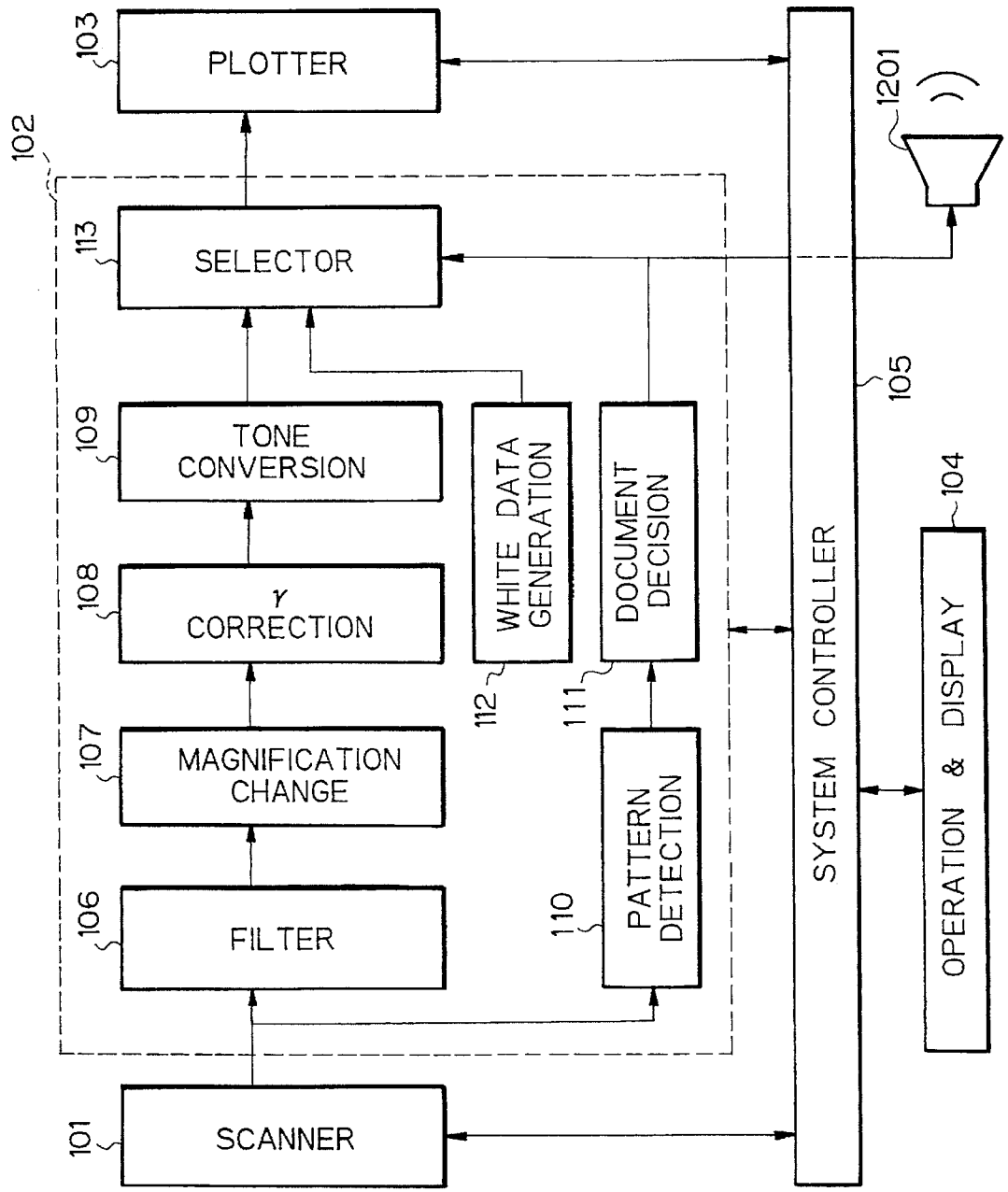

FIG. 12 is a block diagram schematically showing the fifth embodiment. Assume that the document decision 111 causes the white data decision signal coupled to the system controller 105 to go high. Then, the system controller 105 determines that an inhibited document has been copied and generates a tone for warning via a buzzer 1201. Of course, the buzzer 1201 may be replaced with a loudspeaker for producing an audible message registered at the copier beforehand.

With the buzzer 1201, this embodiment checks persons tending to copy confidential documents improperly and, at the same time, alerts persons around the copier to the improper reproduction, while achieving the advantages of the first embodiment.

6th Embodiment

This embodiment allows the inhibition to be cancelled, i.e., allows an inhibited document to be copied by an authorized person, as needed. This embodiment is essentially similar to the first embodiment except for the following.

Figure 13:
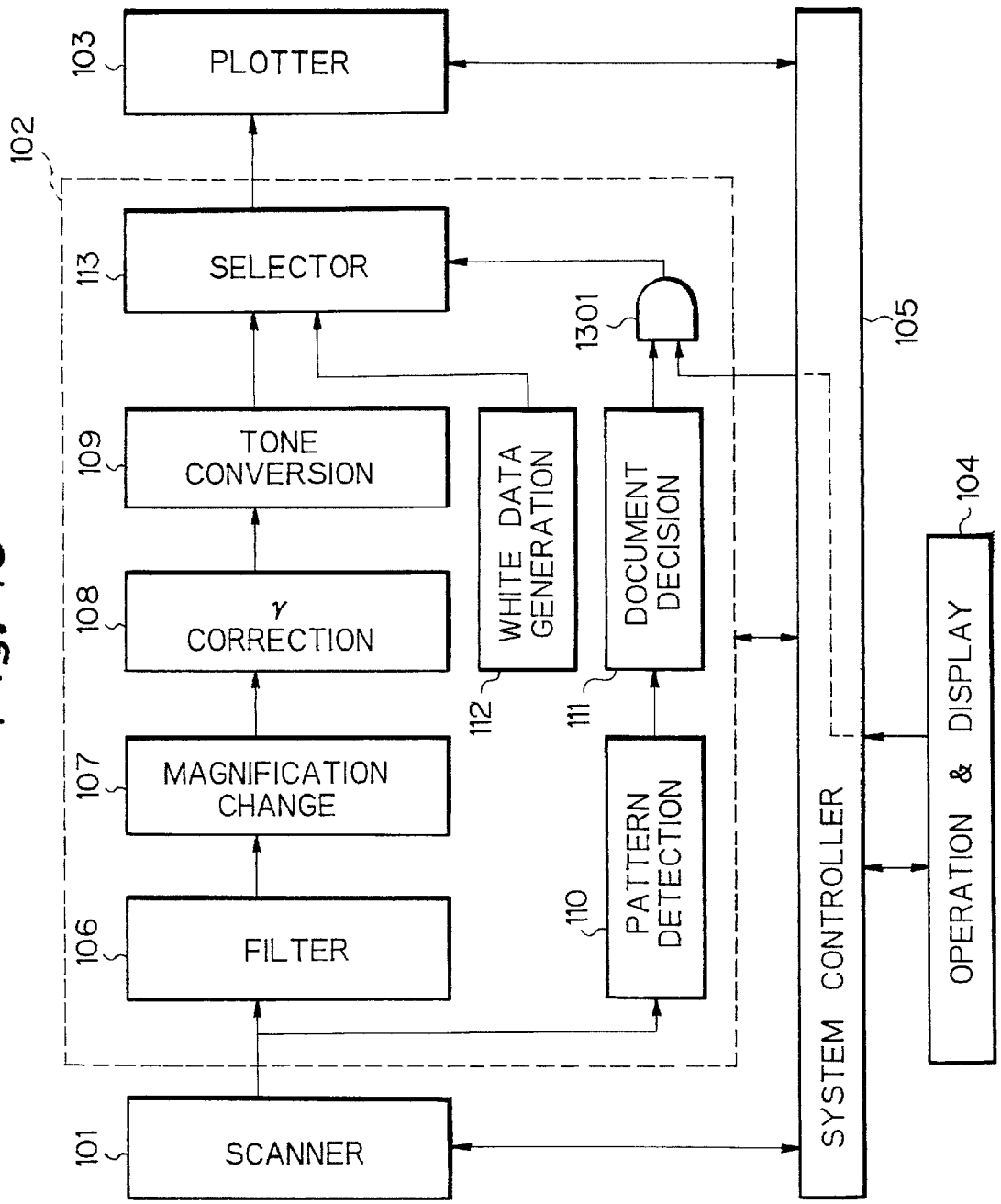

FIG. 13 is a block diagram schematically showing the sixth embodiment. As shown, the embodiment includes an AND gate 1301. When a particular identification number is entered on the operation and display panel 104, the result of decision from the document decision 111 is invalidated with the result that an ordinary copy mode is set up. Specifically, the white data select signal is coupled to the AND gate 1301 and goes high in the case of an inhibited document or goes low in the case of an ordinary document. On the other hand, an inhibition signal is coupled from the system controller 105 to the AND gate 1301 and usually remains in a high level for validating the inhibition. In this configuration, when the white data select signal goes high, the AND gate 1301 delivers the high level white data select signal to the selector 113 as a result of ANDing.

When a particular identification number is entered on the operation and display panel 104, the system controller causes the inhibition signal to go low in order to cancel or invalidate the inhibition. In response, the AND gate 1301 feeds a low level white data select signal to the selector as a result of ANDing without regard to the output of the decision 111. Stated another way, the identification number entered on the panel 104 invalidates the result of decision of the decision 111, thereby setting up an ordinary copy mode.

As stated above, this embodiment is capable of invalidating the output of the decision 111, i.e., cancelling the inhibition in response to an identification number entered on the operation and display panel 104. This allows only an authorized person to copy inhibited documents, as needed.

Figure 14:
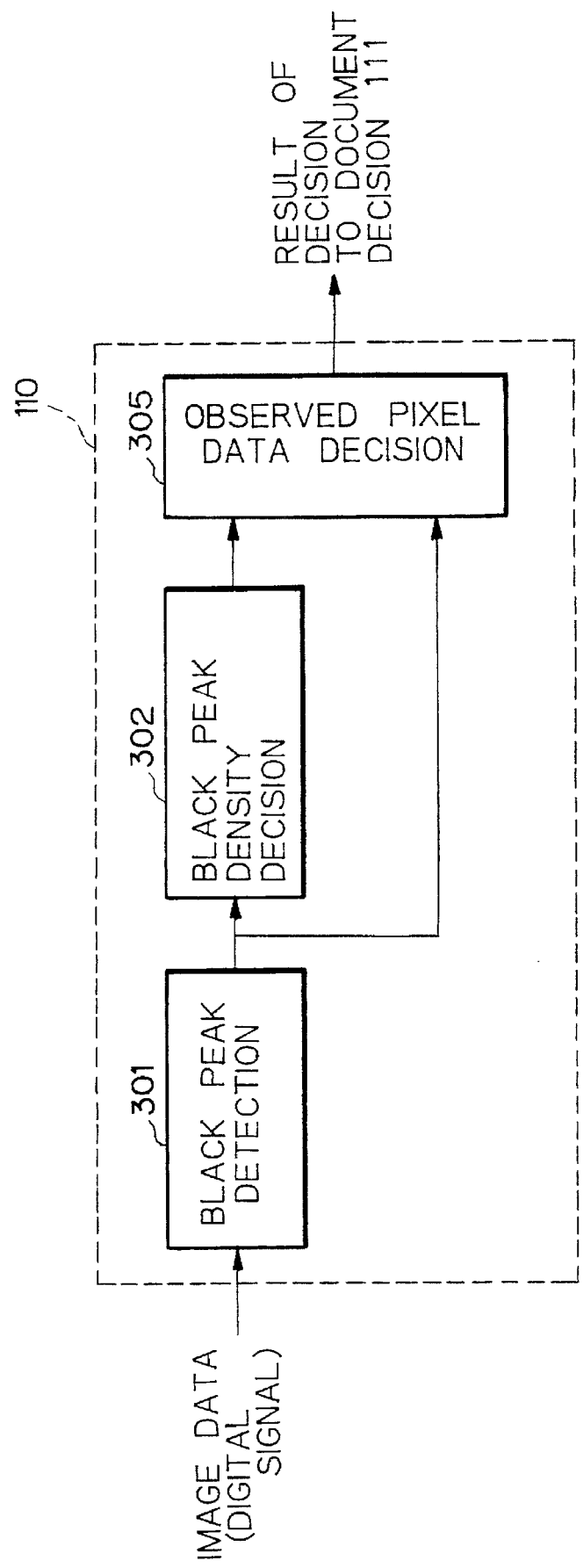
FIG. 14 is a block diagram schematically showing an alternative arrangement of the pattern detecting section.

In the embodiments described so far, the pattern detection 110 consists of the black peak detection 301, black peak density detection 302, white ground detection 303, surrounding white ground detection 304, and observed pixel data decision 305, as shown in FIG. 3. FIG. 14 shows an alternative pattern detection 110 which is made up of a black peak detection 301, a black peak density decision 302, and an observed pixel data decision 305. The black peak detection 301 determines whether or not pixel data under observation is a black peak. The black peak density decision 302 determines, based on the output of the black peak detection 301, whether or not the black peak density of a predetermined area centering around the pixel data under observation is coincident with a predetermined black peak density particular to the inhibition pattern. In this configuration, when the result of decision of the black peak density decision 302 indicates the predetermined black peak density, the observed pixel data decision 305 determines that the pixel data being observed is part of the inhibition pattern. Such an alternative arrangement is comparable with the foregoing embodiments in respect of advantages.

7th Embodiment

This embodiment, like the first embodiment, determines whether or not pixel data are part of the inhibition pattern pixel by pixel, counts the pixel data determined to be part of the inhibition pattern, and determines whether or not the document is an inhibited document on the basis of the resulting count. Again, use is made of a sheet over which the inhibition patterns are printed or copied beforehand. The following description will concentrate on the differences of the seventh embodiment from the first embodiment.

Figure 15:
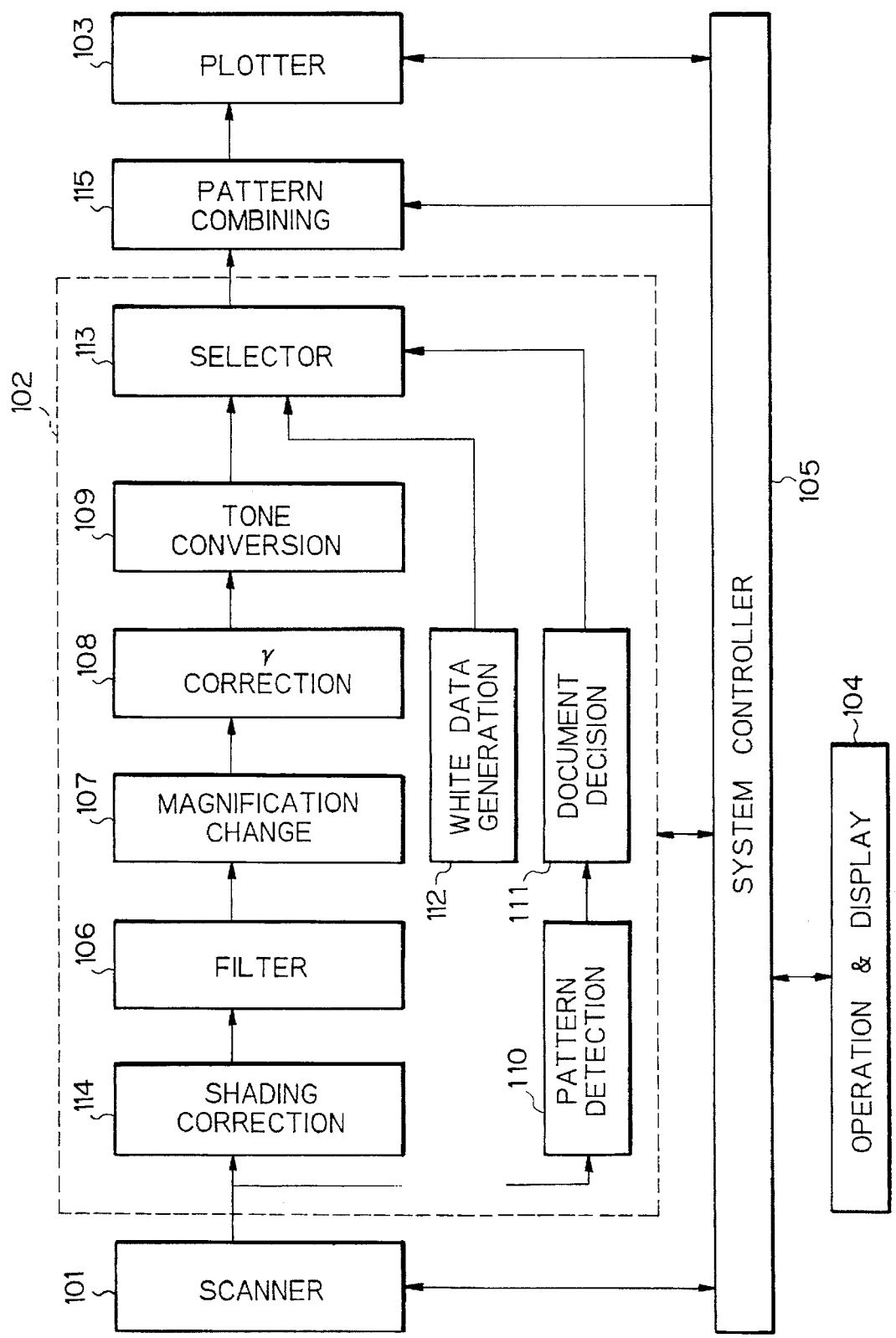
FIG. 15 is a schematic block diagram showing a seventh embodiment of the present invention.

FIG. 15 shows the seventh embodiment in a schematic block diagram. As shown, an inhibition pattern combining section 115 is connected between the image processing section 102 and the plotter 103 in order to combine the inhibition patterns with the image data output from the image processing section 102. A shading correction 114 is included in the image processing section 102 for executing shading correction with the image data output from the scanner 101. In this configuration, when a confidential original document is copied, the inhibition patterns may be printed on a copy by the combining section 115, thereby producing an inhibited document.

Figure 16:
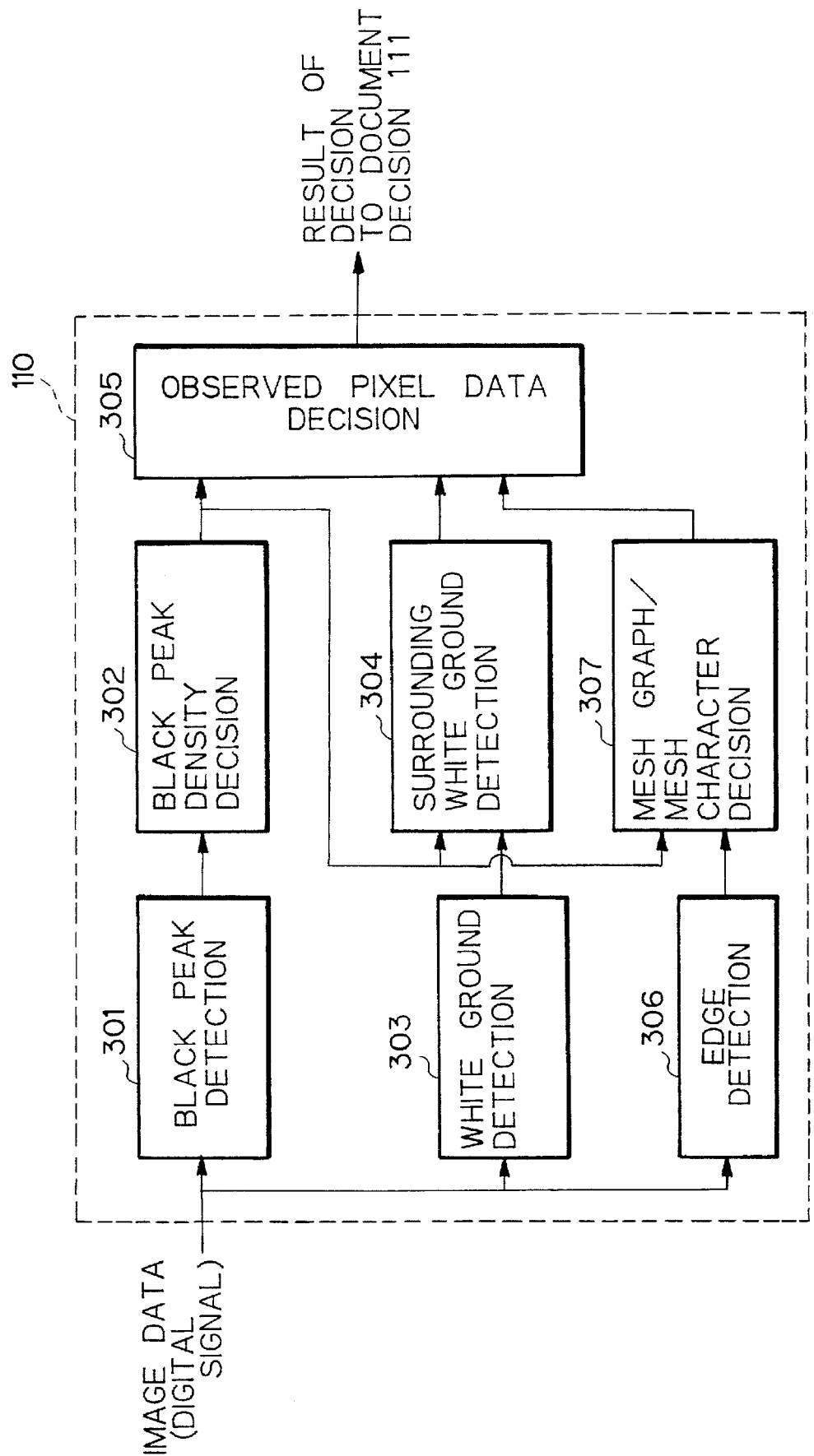
FIG. 16 is a schematic block diagram showing a pattern detecting section included in the seventh embodiment.

FIG. 16 shows the pattern detection 110 in a schematic block diagram. This pattern detection 110 differs from the pattern detection 110 of FIG. 3 in that it additionally includes an edge detection 306, and a mesh graph/mesh character decision 307. The edge detection 306 detects an edge portion on receiving the image data. The mesh graph/mesh character decision 307 determines, on receiving the results of decision from the black peak density decision 302 and edge detection 306, whether or not the pixel data under observation and determined to be a pixel coincident with the black peak density of the inhibition pattern lies in a mesh graph portion or a mesh character portion.

Figure 17:
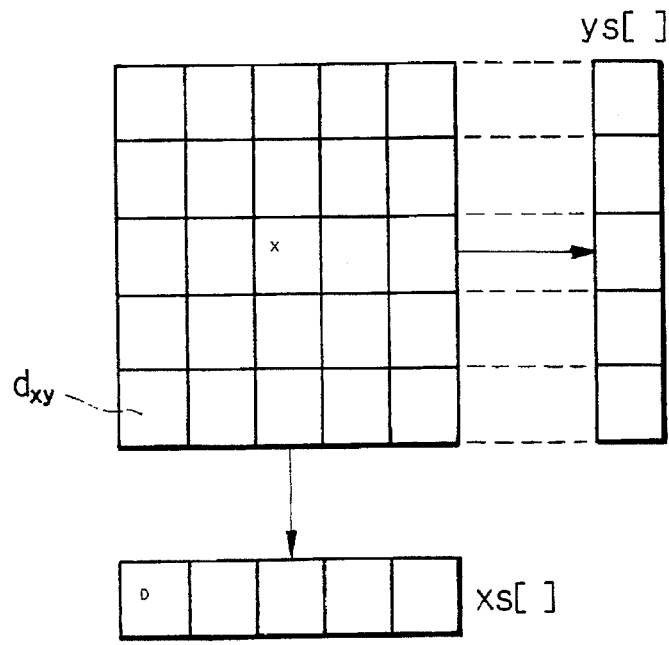
FIGS. 17 and 18 demonstrate a procedure for identifying edge pixels.

Specifically, the edge detection 306 determines whether or not a pixel lies in an edge portion. While the edge pixel identification is based on an N by N reference matrix, the embodiment uses a 5 by 5 matrix by way of example. For the elements of the reference matrix, there are set values produced by binarizing individual pixels by a threshold for edge pixel identification. FIG. 17 demonstrates an edge detection identification procedure. As shown, projections xs[] and ys[] of the 5 by 5 pixel matrix are produced in the x and y directions, respectively.

For example, the element xs[0] is expressed by the following Eq. (1) and schematically shown in FIG. 18. Let each element of the 5×5 matrix be represented by dxy.

$$xs[0]=d00\|d01\|d02\|d03\|d04 \qquad \text{Eq. (1)}$$

Figure 18:
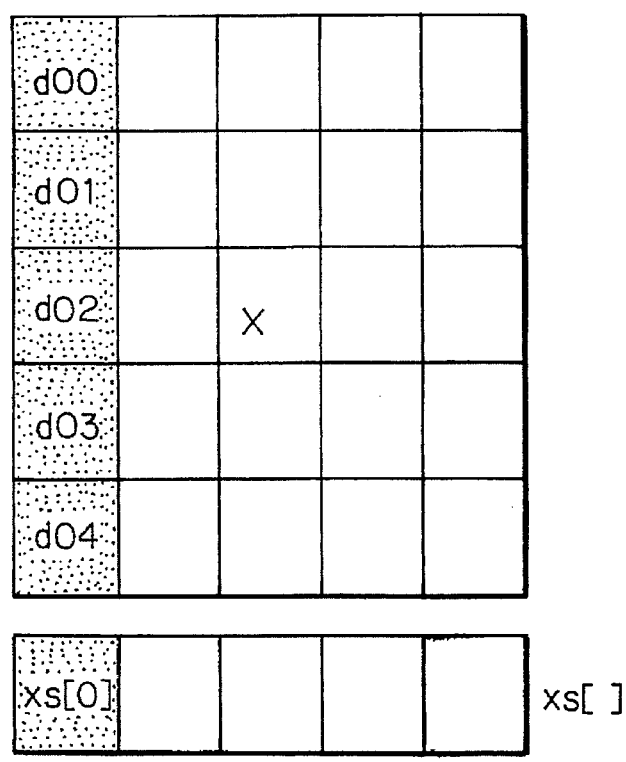

The Eq. (1) means that a group of meshed pixels shown in FIG. 18 are ORed. In the same manner, the elements xs[] and ys[] are calculated.

Subsequently, the projections in the x and y directions are determined as to continuity by use of the calculated xs[] and ys[] and Eq. (2) shown below:

$$xs = xs[0]\&\&xs[1]\&\&xs[2]\&\&xs[3]\&\&xs[4] \qquad \text{Eq. (2)}$$

$$ys = ys[0]\&\&ys[1]\&\&ys[2]\&\&ys[3]\&\&ys[4]$$

The results xs and ys of decision on continuity are each an AND of the associated elements, as seen from the above Eq. (2).

Thereafter, whether or not the center pixel X of FIG. 17 is an edge pixel is determined. Specifically, the results of decision on continuity xs and ys are ORed, as expressed as:

$$x=xs\|ys \qquad \text{Eq. (3)}$$

Figure 19:
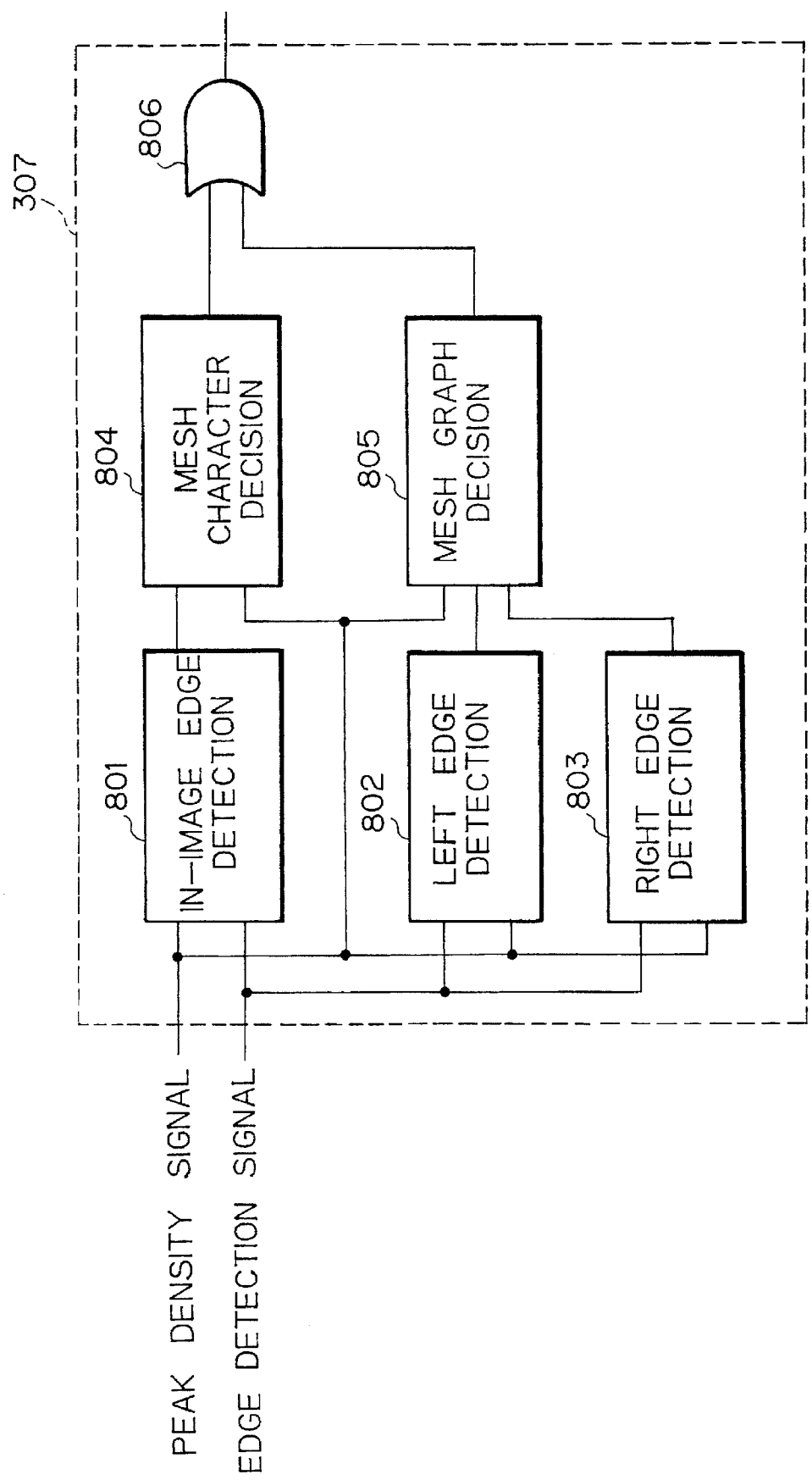
FIG. 19 is a block diagram schematically showing a mesh graph/mesh character detecting section.
Figure 20A:
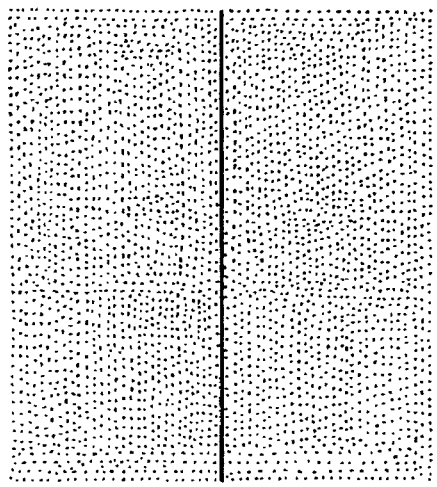
FIGS. 20A–20C show how the edge pixels of a mesh image are detected by an in-image edge detecting section, left edge detecting section and a right edge detecting section.
Figure 20B:
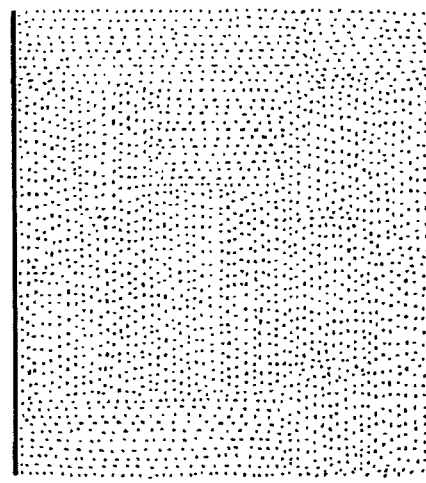
Figure 20C:
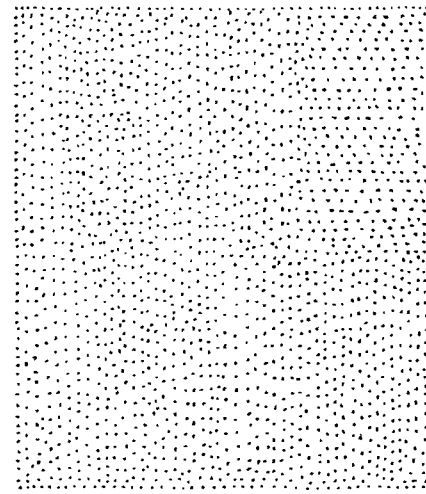

FIG. 19 shows the mesh graph/mesh character decision 307 specifically. As shown, the decision 307 is made up of an in-image edge detection 801, a left edge detection 802, a right edge detection 803, a mesh character decision 804, a mesh graph decision 805, and an OR gate 806. Among them, the in-image edge detection 801, left edge detection 802 and right edge detection 803 respectively detects edge pixels existing in a mesh image, edge pixels existing at the left edge of a mesh image, and edge pixels existing as the right edge of a mesh image, as shown in FIGS. 20A–20C.

Assume that a pixel under observation is an edge pixel. Then, whether or not a pixel is present which lies in a predetermined area centering around pixel data under observation within WDTH widths in the main scanning or right-and-left direction and determined to have a black peak density coincident with that of the inhibition pattern is determined, where WDTH is a width. If such a pixel is present at the right and left of the pixel of interest, the pixel is determined to be an edge pixel in a mesh image. If the former is present only at the right of the latter, the latter is determined to be a left edge pixel; if the former is present only at the left of the latter, the latter is determined to be a right edge pixel.

Subsequently, the mesh character decision 804 determines whether or not the pixel under observation lies in the above-mentioned particular area and adjoins an in-image edge pixel. If these conditions are satisfied, the decision 804 determines that the pixel under observation is a pixel lying in a mesh character portion. Further, the mesh graph decision 805 determines that a pixel under observation lies in a mesh graph portion on condition that it lies in the above-mentioned particular area, that a mesh image left edge pixel is positioned nearest thereto in the left LNGTH range, and that a mesh image right edge pixel is present nearest thereto in the right LNGTH range, where both of the LNGTHs are lengths.

Finally, the OR gate 806 ORs the result of decision on the mesh character portion and that on the mesh graph portion pixel by pixel. With such a procedure, it is possible to identify a mesh character portion and a mesh graph portion having a feature similar to that of the black peak of the inhibition pattern.

Assume that the observed pixel data decision 305, FIG. 16, determines, based on the outputs of the black peak density decision 302, surrounding white ground decision 304 and mesh graph/mesh character decision 307, that the pixel under observation has a black peak density coincident with that of the inhibition pattern, that it is a surrounding white ground pixel, and that it is not a mesh graph/mesh character pixel. Then, the decision 305 determines that the pixel data under observation is an inhibition pattern pixel.

Figure 21A:
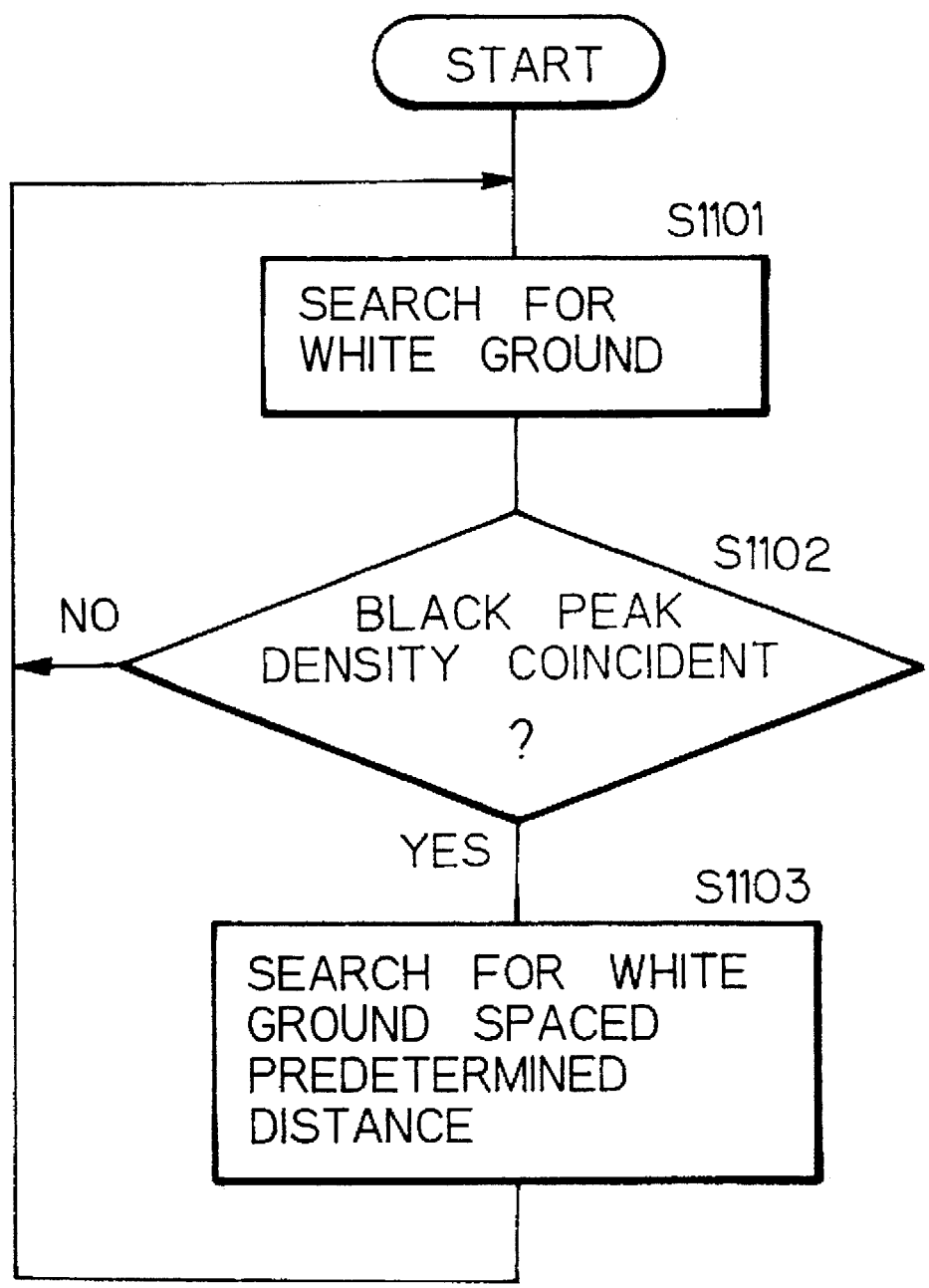
FIGS. 21A–21C are flowcharts demonstrating a specific operation of the pattern detecting section included in the seventh embodiment.
Figure 21B:
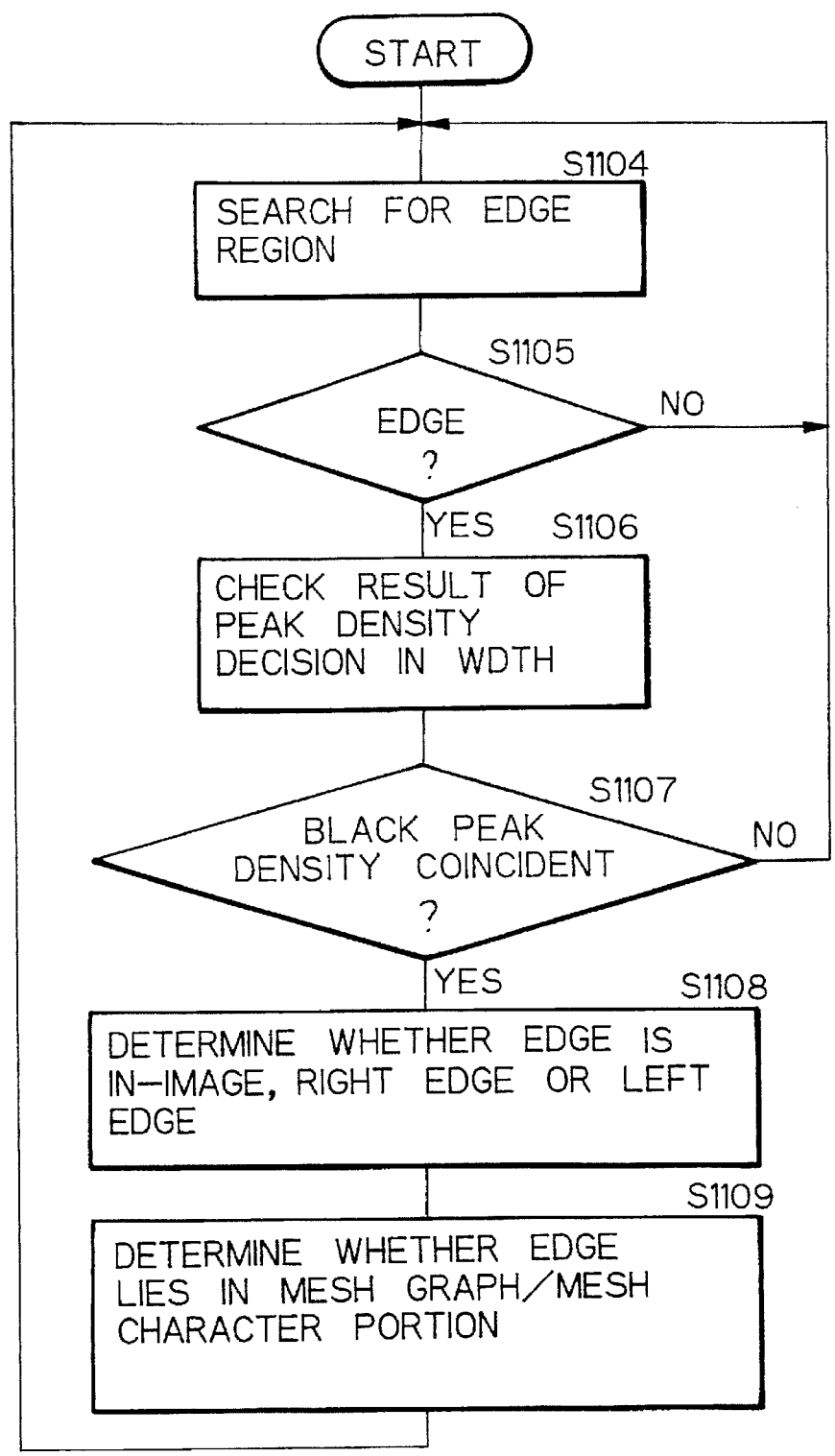
Figure 21C:
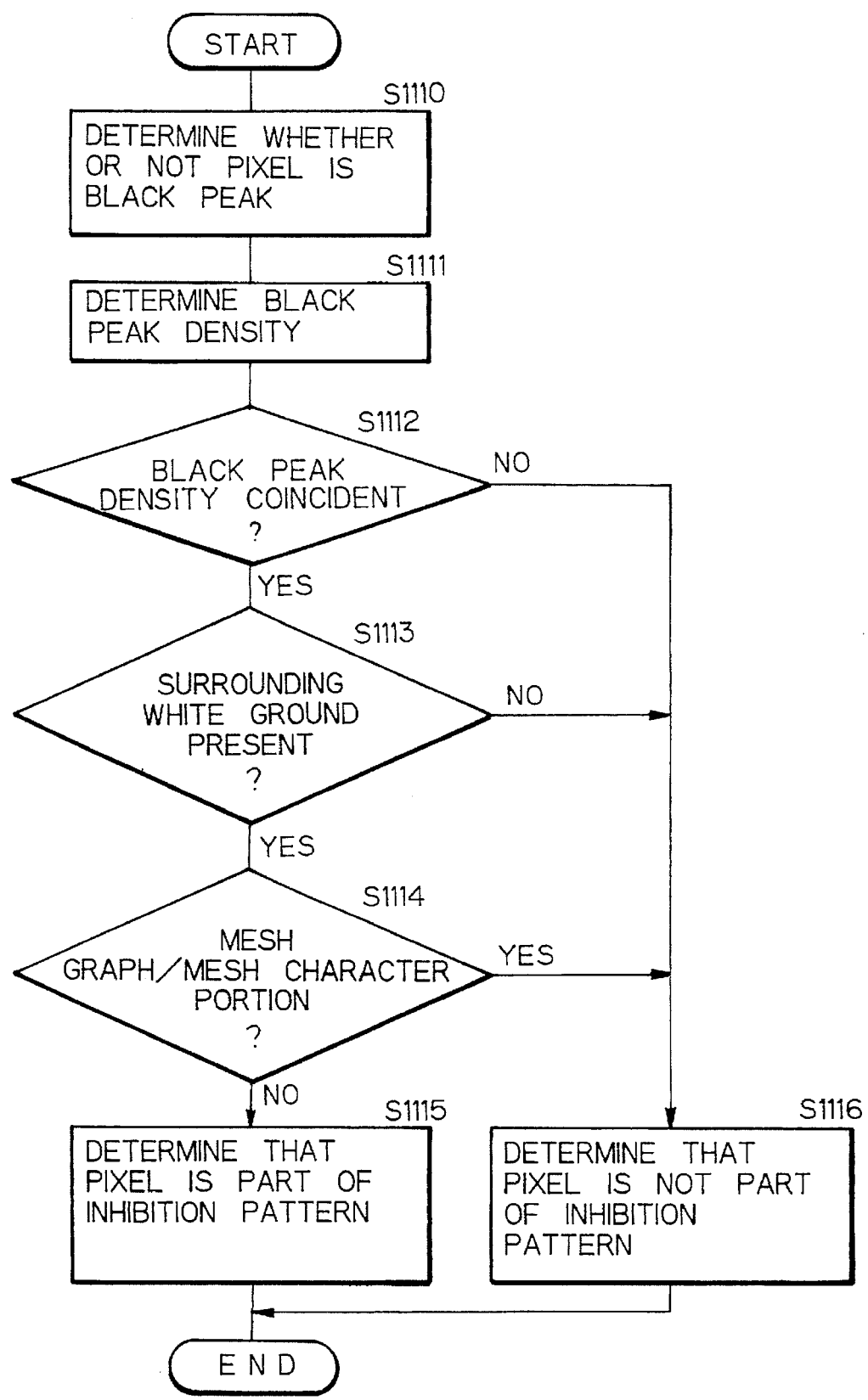

FIGS. 21A–21C show a specific operation of the pattern detection 110. Specifically, FIG. 21A demonstrates the operations of the white ground detection 303 and surrounding white ground decision 304. FIG. 21B represents the operations of the edge detection 306 and mesh graph/mesh character decision 307. FIG. 21C shows the operations of the black peak detection 301, black peak density decision 302, and observed pixel data decision 305. The flows shown in these figures occur in parallel at the same time.

As shown in FIG. 21A, the white ground detection 303 determined whether or not a white ground exists in a predetermined region (step S1101). Subsequently, the surrounding white ground decision 304 determines a black peak density on the basis of the output of the black peak decision 302 (step S1102). If the answer of the step S1102 is positive, Yes, the decision 304 determines whether or not a white ground is present in a portion a predetermined distance apart from the pixel determined to be a black peak density coincidence pixel, feeding the result of decision to t h e observed pixel data decision 305 (step S1103). If the answer of the step S1102 is negative, No, the program returns to the step S1101, ending the processing on the pixel data under observation.

As shown in FIG. 21B, the edge detection 306 detects an edge portion by producing the projections of the reference matrix in the x and y directions (step S1104). Then, whether or not a pixel is an edge pixel is determined (step S1105). If it is at, edge pixel (Yes, step S1105), the result of decision on black peak density is examined in the right-and-left WDTH (step S1106). If a portion whose black peak density is coincident with that of the inhibition pattern is present at the right and/or the left, whether the edge pixel of interest is an in-image edge, right edge or left edge of a mesh image is determined (steps S1107 and S1108). Subsequently, whether the portion is a mesh graph/mesh character portion is determined, and the result of decision is fed to the observed pixel data decision 305 (step S1109). If the pixel is not an edge pixel or if a black peak density coincidence pixel is absent, the program returns to the step S1104, ending the processing on the pixel data under observation.

As shown in FIG. 21C, the black peak detection 301 determines whether or not a black peak pixel is present (step S1110), and then the black density decision 302 determines a black peak density (step S1111). Subsequently, whether the black peak density is coincident with that of the inhibition pattern is determined (step S1112). If the answer of the step S1112 is negative, No, it is determined that the pixel under observation is not part of the inhibition pattern (step S1116). If the answer of the step S1112 is positive, Yes, whether or not surrounding white ground pixels are present is determined (S1113). If the answer of the step S1113 is negative, No, it is determined that the pixel is not part of the inhibition pattern (S1116). If the answer of the step S1113 is positive, Yes, whether or not the pixel lies in a mesh graph/mesh character portion is determined (S1114). If the answer of the step S1114 is positive, Yes, it is determined that the pixel is not part of the inhibition pattern (S1116). If the answer of the step S1111 is negative, No, it is determined that the pixel is part of the inhibition pattern (S1115).

It is to be noted that the steps S1110–S1116 are executed with each pixel data and then with the entire input image.

How the pattern combining section 115 is operated for forming the inhibition patterns on a sheet, i.e., producing an inhibited document is as follows. To begin with, a predetermined key on the operation and display panel 104 is pressed to enter an inhibition pattern generation command. In response, the system controller 105 sends a combine signal to the pattern combining section 115. On receiving the combine signal, the pattern combining section 115 combines the inhibition patterns shown in FIGS. 2A and 2B with the image signal output from the selector 113 and sends the resulting composite image signal to the plotter 103. As a result, the plotter 103 produces a sheet on which the inhibition patterns are printed, i.e., an inhibited document.

As stated above, the illustrative embodiment causes the pattern combining section 115 to combine the inhibition patterns with the image data and outputs an inhibition pattern via the plotter 103. This embodiment is, therefore, comparable with the previous embodiments in respect of advantages.

8th Embodiment

This embodiment is essentially similar to the seventh embodiment except that it determines whether or not to thin, or reduce, lines in the subscanning direction, and that it changes the parameters of the pattern detection 110 so as to ensure the identification of an inhibited document even when the magnification is changed. The following description will concentrate only on the difference of this embodiment from the seventh embodiment.

Figure 22:
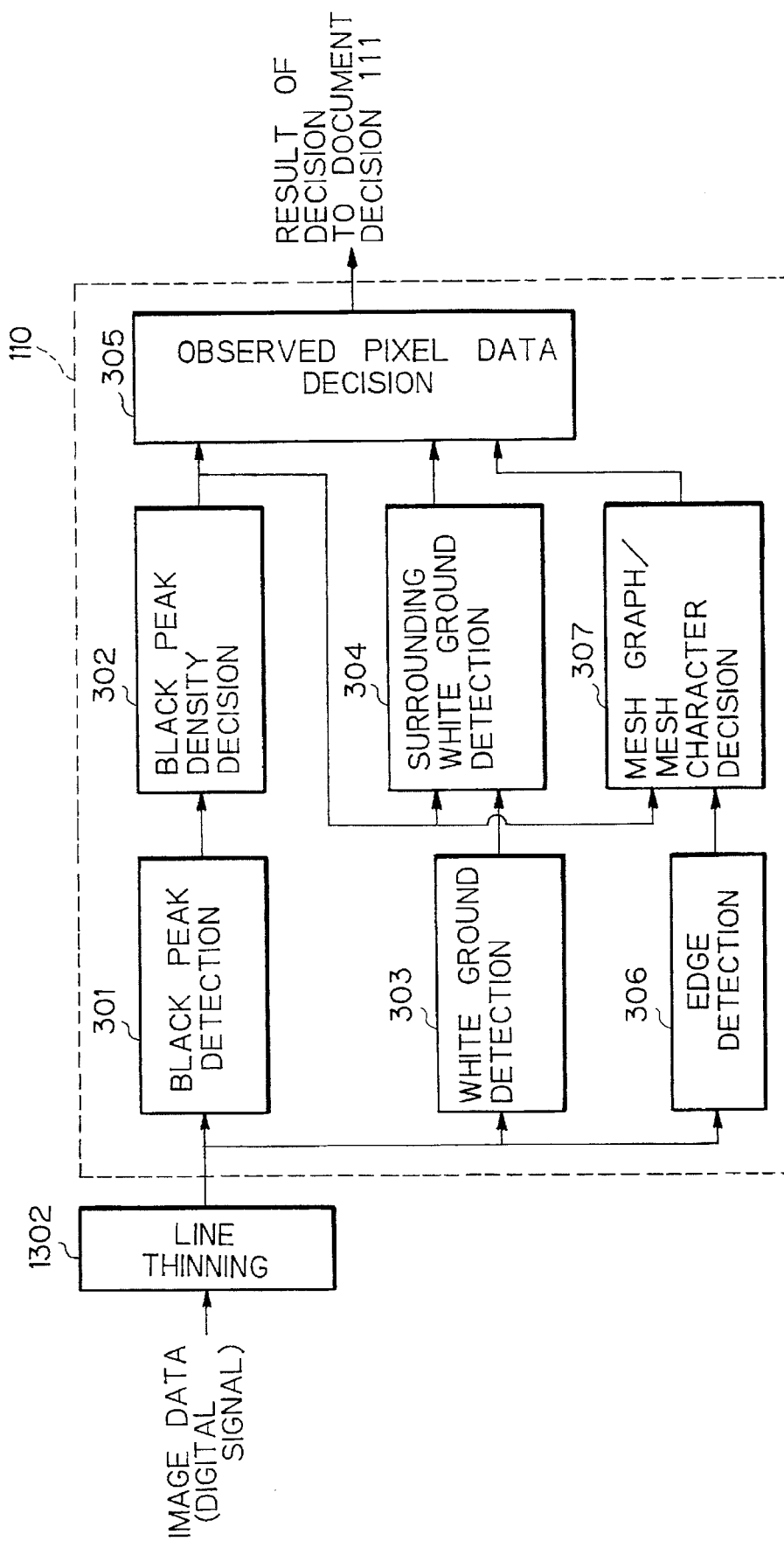
FIG. 22 is a block diagram schematically showing a pattern detecting section representative of an eighth embodiment of the present invention.

FIG. 22 shows the pattern detection 110 including a line thinning section 1302 in addition to the constituents of the seventh embodiment. The line thinning section 1302 thins lines in the subscanning direction in matching relation to a magnification change ratio and generates a line synchronous signal meant for the pattern detection 110 and document decision 111.

Figure 23A:
FIGS. 23A–23D show a line thinning procedure and line synchronous signals to occur when the magnification change ratio is 200%.
Figure 23B:
Figure 23C:
Figure 23D:

When the magnification change ratio is 200%, for example, the line thinning section 1302 sends to the pattern detection 110 a signal in which every other line is omitted. At this instant, the line thinning section 1302 generates a line synchronous signal twice as great as the line synchronous signal of the image data input to the section 1302. Specifically, FIG. 23A shows the line synchronous signal of the image data input to the line thinning section 1302 while FIG. 23B shows the line synchronous signal output from the section 1302. The signal shown in FIG. 23B is used by the pattern detection 110 and document decision 111. FIG. 23C shows the lines of the image data input to the line thinning section 1302. Assuming the magnification change ratio of 200%, the lines shown in FIG. 23C are thinned every other line. As a result, the line thinning section 1302 outputs lines shown in FIG. 23D.

Figure 24:
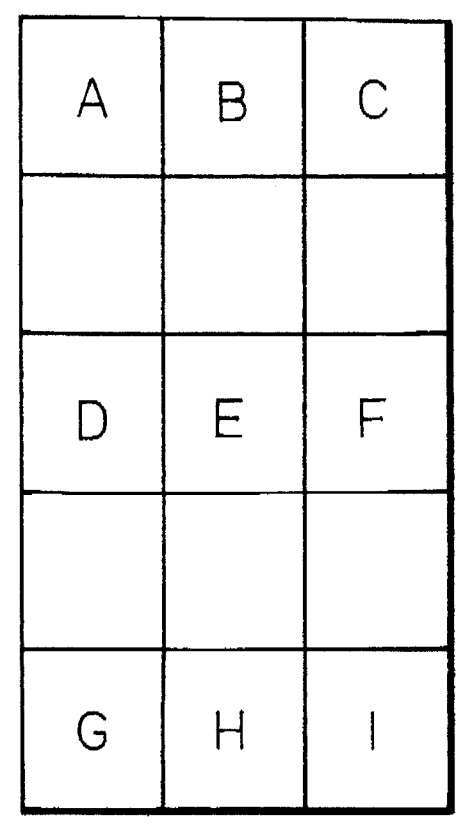

The pattern detection 110 changes the matrix of the black peak detection 301 and that of the edge detection 306 on the basis of the magnification change ratio. Specifically, when the line thinning section 1302 does not thin the lines in an enlargement mode, the black peak detection 301 uses a 3 by 5 matrix shown in FIG. 24 in place of the 3 by 3 matrix shown in FIG. 4. When the section 1302 thins the lines, the detection 301 uses the 3 by 3 matrix of FIG. 4. The procedure is identical with that of the seventh embodiment except for the positions of pixels other than a pixel E.

Figure 25:
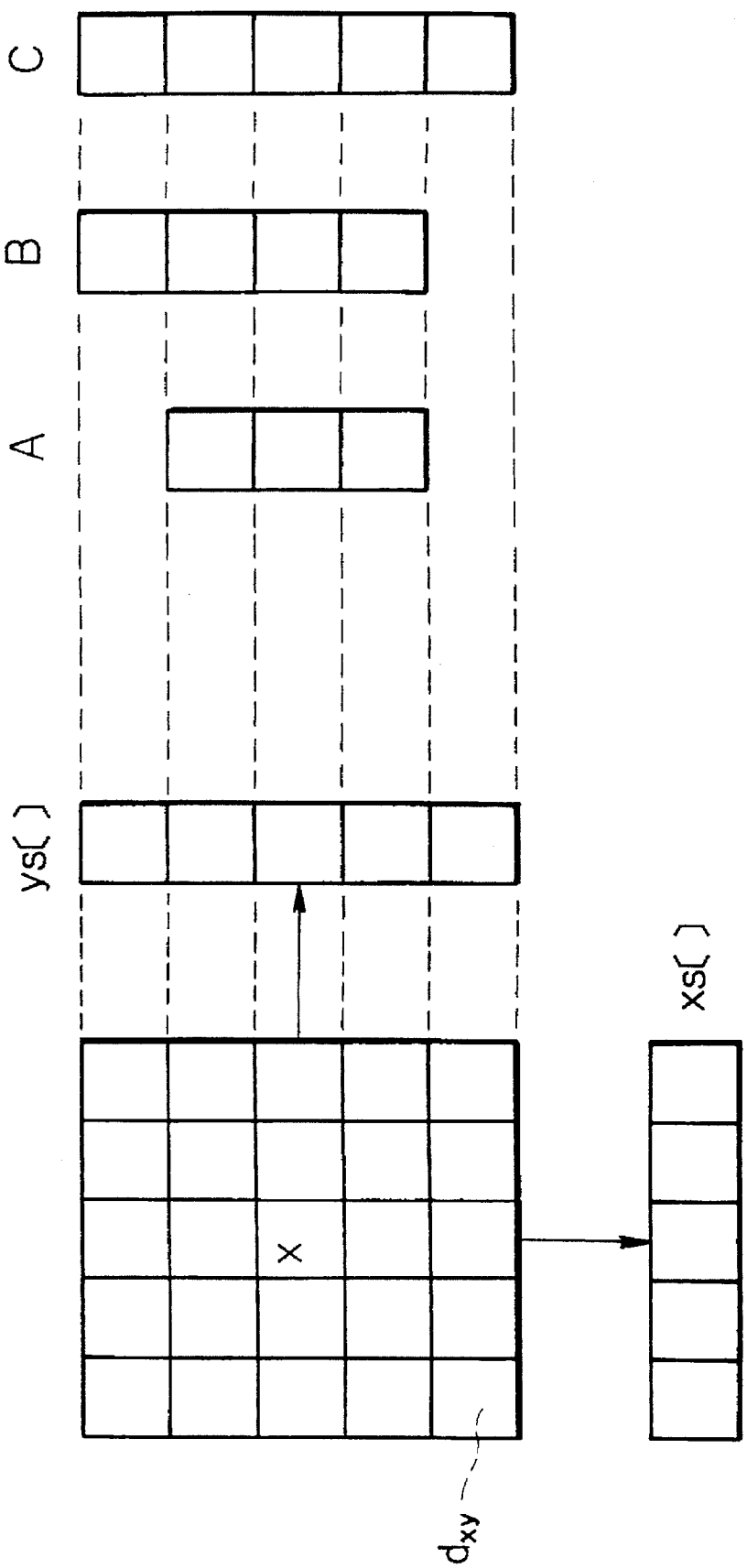
FIG. 25 shows edge pixel detection particular to the eighth embodiment.

Regarding the edge detection 306, while edge pixel decision is executed by use of an N by N pixel reference matrix, the embodiment uses a 5 by 5 matrix. The individual pixels are binarized by an edge pixel decision threshold beforehand, and the resulting values are set as the elements of the reference matrix. FIG. 25 demonstrates an edge pixel decision procedure. For edge decision, the projections of the 5 by 5 matrix in the x and y directions are produced and respectively labeled xs[] and ys[].

For the projection xs[], the embodiment operates in the same manner as the seventh embodiment. For the projection ys[], the embodiment selects A, B or C shown in FIG. 25 in matching relation to the magnification change ratio. Equations for the decision are the same as those of the seventh embodiment except for their size. For example, in a 50% reduction mode, A of FIG. 25 is used. Specifically, in such a mode, since the scanner reads an image at a variable speed, the length per pixel over which the document is read in the subscanning direction is shorter than in the case of a x1 mode. This can be compensated for only if A of FIG. 25 is used.

When the line thinning section 1302 thins the lines in an enlargement mode, the above procedure is executed since the pattern detection 1301 will, in an apparent sense, receive image data reduced in scale.

In summary, it will be seen that the present invention provides an image processing device having various unprecedented advantages, as enumerated below.

(1) The device surely identifies an inhibited document on which inhibition patterns are printed or copied over the entire area. Hence, inhibited documents are surely prevented from being copied, transferred, stored, or input.

(2) In the case of an inhibited document, the device, for example, masks image data with another image signal for thereby invalidating the image data. This prevents such image data from being output.

(3) When the probability that image data representative of inhibited documents are input is high, the device executes more strict decision.

(4) The device checks an unauthorized person tending to copy an inhibited document and, in addition, informs persons around copier of the improper copying.

(5) Since the inhibition can be invalidated, only an authorized person is allowed to copy even an inhibited document, as needed.

(6) The device can produce an inhibited document and identify it as an inhibited document. Specifically, the device is provided with pattern printing means so as to produce and identify inhibition documents with ease.

(7) Even in a magnification change mode, the device can detect inhibition patterns and identify an inhibited document with accuracy.

Various modifications will become possible for those skilled in the art after receiving the teachings of the present disclosure without departing from the scope thereof.

What is claimed is:

1. An image processing device for executing various kinds of image processing, including filtering, magnification change and gamma correction, with input image data, said device comprising:

pattern detecting means for determining, pixel data by pixel data, whether or not pixel data constituting the input image data are part of a predetermine inhibition pattern, said pattern detecting means having variable detection accuracy;

document deciding means for determining, based on a number of pixel data determined to be part of said predetermined inhibition pattern by said pattern detecting means, whether or not the input image data are representative of an inhibited document inhibited from being copied, said document deciding means having variable decision accuracy; and changing means for changing the detection accuracy of said pattern detecting means and the decision accuracy of said document deciding means;

wherein the inhibited document comprises a sheet on which said inhibition pattern is printed or copied over an entire area thereof, wherein said changing means comprises timer means and automatically changes the detection accuracy of said pattern detecting means and the decision accuracy of said document deciding means according to a period of time preset for said timer means, wherein the changing means comprises:

a memory for storing different parameters utilized by the pattern detecting means and the document deciding means, wherein the image processing device further comprises a controller which loads different parameters from the memory to the pattern detecting means and the document deciding means, depending on the period of time preset for said timer means.

2. A device as claimed in claim 1, wherein said changing means comprises an operation panel.

3. An image processing device, comprising:

pattern detecting means for determining whether or not pixel data constituting an input image data are part of a predetermine inhibition pattern;

document deciding means for determining, based on a number of pixel data determined to be part of said predetermined inhibition pattern determined by said pattern detecting means, whether or not the input image data is representative of a document inhibited from being copied;

a timer means; and changing means for changing an accuracy of at least one of an operation of said pattern detecting means and an operation of said document deciding means according to a time of the timer means;

wherein the document inhibited from being copied comprises a sheet on which said inhibition pattern is printed or copied, wherein the changing means comprises:

a memory for storing different parameters utilized by the pattern detecting means and the document deciding means, wherein the image processing device further comprises a controller which loads different parameters from the memory to at least one of said pattern detecting means and said document deciding means, according to a time of the timer means.

\* \* \* \* \*